(12) United States Patent
Hamada

(10) Patent No.: US 8,452,287 B2
(45) Date of Patent: May 28, 2013

(54) COMMUNICATION SYSTEM, PARAMETER SETTING CONTROL APPARATUS AND CONTROL METHOD

(75) Inventor: Masashi Hamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 940 days.

(21) Appl. No.: 12/241,804

(22) Filed: Sep. 30, 2008

(65) Prior Publication Data

US 2009/0109899 A1    Apr. 30, 2009

(30) Foreign Application Priority Data

Oct. 30, 2007  (JP) ................................ 2007-282351

(51) Int. Cl.
*H04W 36/00* (2009.01)

(52) U.S. Cl.
USPC .......................................... 455/436; 455/525

(58) Field of Classification Search
USPC ................................................ 455/11.1, 509
See application file for complete search history.

(56) References Cited

U.S. PATENT DOCUMENTS

| | | | | |
|---|---|---|---|---|
| 6,154,652 A * | 11/2000 | Park et al. | ...................... | 455/437 |
| 7,103,359 B1 * | 9/2006 | Heinonen et al. | ............. | 455/436 |
| 2004/0236939 A1 * | 11/2004 | Watanabe et al. | ............. | 713/150 |
| 2007/0232340 A1 * | 10/2007 | Yamauchi et al. | ............. | 455/509 |
| 2008/0144976 A1 | 6/2008 | Chosa et al. | | |

FOREIGN PATENT DOCUMENTS

| | | |
|---|---|---|
| JP | 2004-080228 | 3/2004 |
| JP | 2004-221684 | 8/2004 |
| JP | 2005-354423 | 12/2005 |
| JP | 2006-314009 A | 11/2006 |

OTHER PUBLICATIONS

"A Communication Channel Control Method in QoS Control System with Multiple Wireless Access POints" IPSJ SIG Technical Report, Feb. 22, 2007, 2007-MBL-40 (13) 2007-UBI-13 (13).

* cited by examiner

*Primary Examiner* — Yuwen Pan
*Assistant Examiner* — Fatuma Sherif
(74) *Attorney, Agent, or Firm* — Cowan, Liebowitz & Latman, P.C.

(57) ABSTRACT

This invention has as its object to implement dynamic processing according to processing loads on access points in a wireless communication local network system including a plurality of independent wireless cells. According to this invention, a communication control method for a communication control apparatus, which controls a wireless communication in a wireless communication local network system including a plurality of independent wireless cells, includes: a step of determining the processing loads of respective APs; a step of selecting an STA, which is to associate with another independent wireless cell built using an AP with a low processing load by switching processing, of STAs, which associate with an independent wireless cell built using an AP with a high processing load; and a step of requesting to transmit parameter information required to associate with the other independent wireless cell.

9 Claims, 17 Drawing Sheets

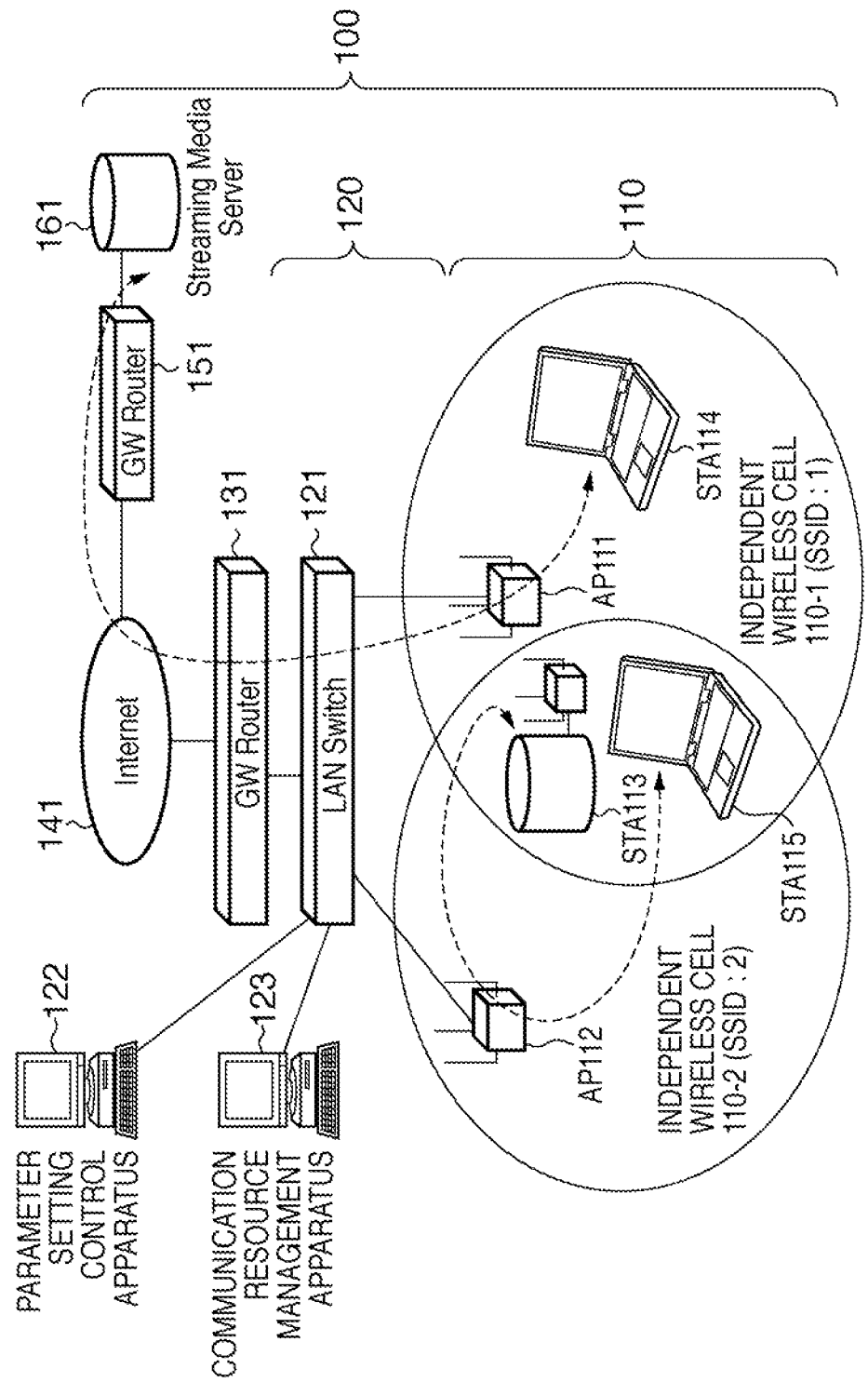

F I G. 2A
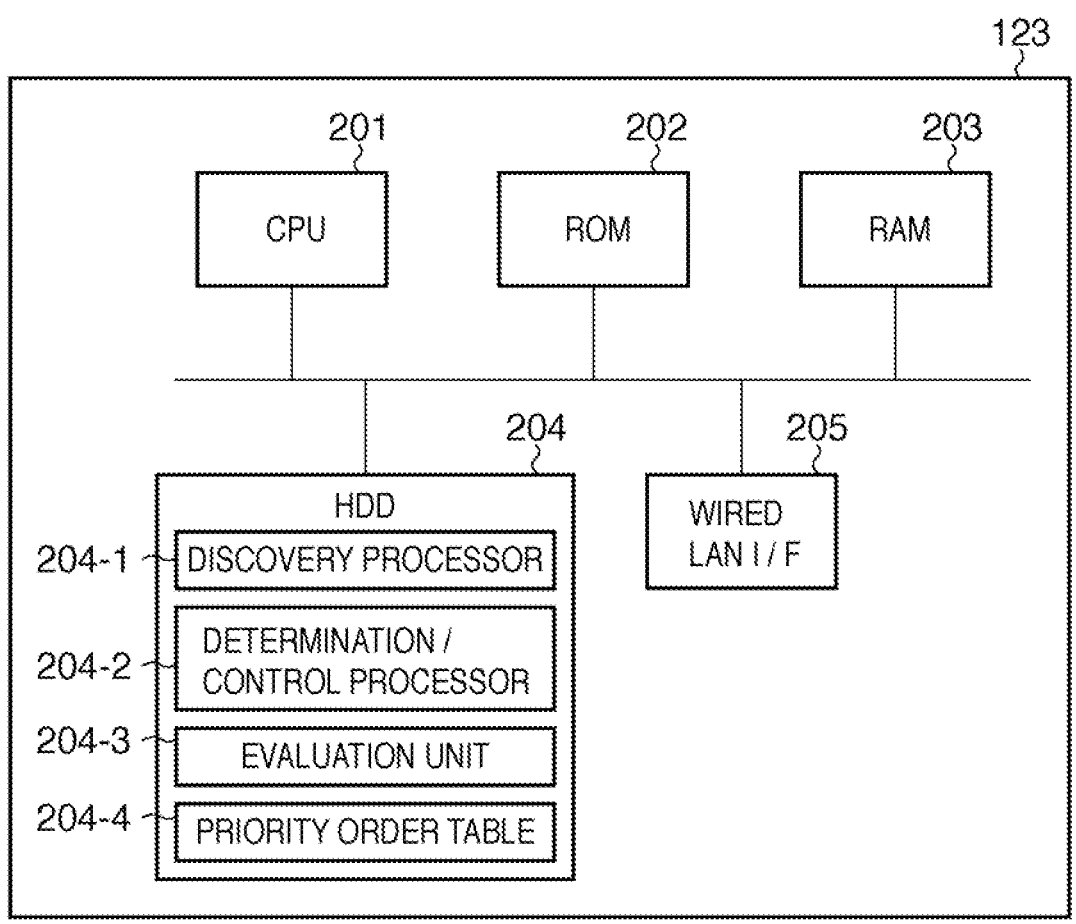

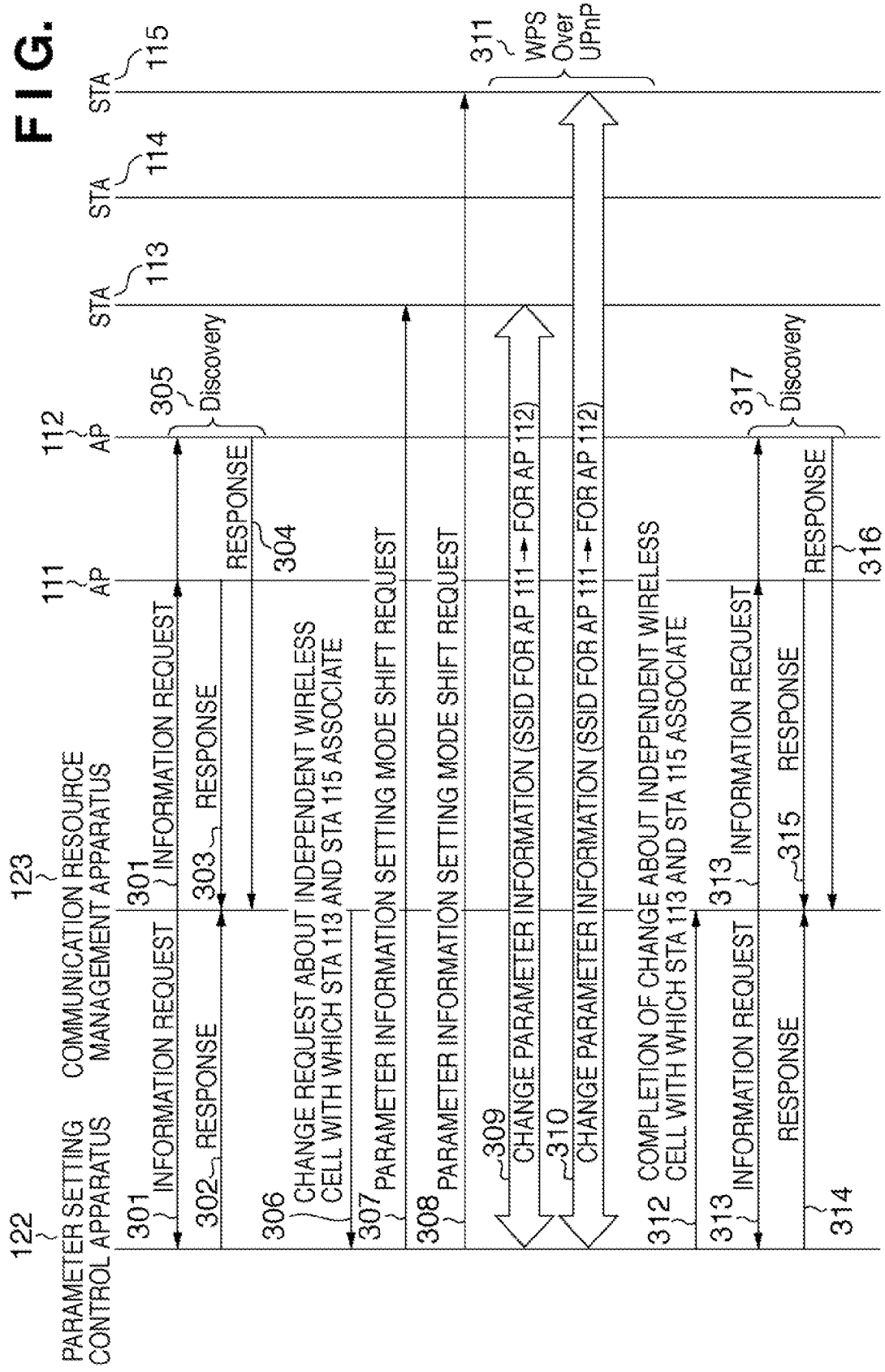

COMMUNICATION SYSTEM, PARAMETER SETTING CONTROL APPARATUS AND CONTROL METHOD

BACKGROUND OF THE INVENTION

1. Field of the Invention

The present invention relates to a communication control technique in a wireless local network system configured by a plurality of independent wireless cells.

2. Description of the Related Art

For a wireless communication local network system including a plurality of independent wireless cells built using a plurality of access points connected to local networks, it is conventionally required to realize communication control according to QoS, and to provide satisfactory communication services.

To meet such requirements, it is effective to execute communication control according to the processing loads on respective access points, and various proposals about such communication control have been made so far.

For example, Japanese Patent Laid-Open No. 2004-80228 discloses a technique in which a wireless client terminal itself, which enjoys communication services, autonomously switches wireless cells associated by the wireless client terminal in accordance with a response speed from a server that provides the communication services.

Japanese Patent Laid-Open No. 2005-354423 discloses a technique in which a management apparatus that manages communication resources is provided on a network, and a wireless client terminal inquires the management apparatus upon setting a communication session, thereby preventing congestion in a wireless local network.

Furthermore, Japanese Patent Laid-Open No. 2004-221684 discloses a technique in which, when a control apparatus which systematically manages association information for respective wireless cells detects that the limited number of associates specified for each wireless cell has been exceeded, it selects a wireless client terminal of that wireless cell and instructs it to execute roaming.

However, in case of Japanese Patent Laid-Open No. 2004-80228, all wireless client terminals need to comprise a function of autonomously changing wireless cells to be associated in accordance with the response speed from the server. For this reason, when a wireless client terminal which does not implement this function is included, satisfactory communication services cannot be provided by the wireless local network system as a whole.

By contrast, when the management apparatus that manages the communication resources is independently arranged on the network like in Japanese Patent Laid-Open No. 2005-354423, the wireless client terminals need not implement the function. However, in case of Japanese Patent Laid-Open No. 2005-354423, the management apparatus merely determines whether or not to provide communication services by managing the communication resources, and no switching processing to another wireless cell is described.

On the other hand, in case of Japanese Patent Laid-Open No. 2004-221684, the control apparatus instructs a wireless client terminal to execute roaming so as to realize switching to another wireless cell. However, in case of the wireless communication local network system to be covered by the present specification, wireless cells built by respective access points are configured by "independent wireless cells", and roaming cannot be applied intact to switching between independent wireless cells. Note that the independent wireless cells are wireless cells having different IEEE 802.11-based SSIDs (identifiers).

SUMMARY OF THE INVENTION

The present invention has been made in consideration of the aforementioned problems.

A communication system according to the present invention comprises the following arrangement. That is, a communication system, which includes a client terminal, an access point, a management apparatus that manages a communication between the client terminal and the access point, and a parameter setting control apparatus that manages parameter information required to make a communication between the client terminal and the access point, wherein the management apparatus:

a notification unit configured to notify the parameter setting control apparatus of switching of an associate destination to another access point by the client terminal which associates with the access point, and the parameter setting control apparatus comprises:

a transmission unit configured to transmit authentication information used in setting processing of parameter information required to communicate with the other access point to the client terminal based on the notification.

According to the present invention, in a wireless communication local network system including a plurality of independent wireless cells, dynamic processing according to the processing loads on access points can be implemented.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a view showing the configuration of a wireless communication local network system 100 which comprises a communication resource management apparatus (communication control apparatus) according to an embodiment of the present invention;

FIG. 2A is a block diagram showing the hardware arrangement of a communication resource management apparatus 123;

FIG. 3 is a flowchart showing the sequence of the overall communication control processing according to the first embodiment in the wireless communication local network system 100;

DESCRIPTION OF THE EMBODIMENTS

Figure 2B:
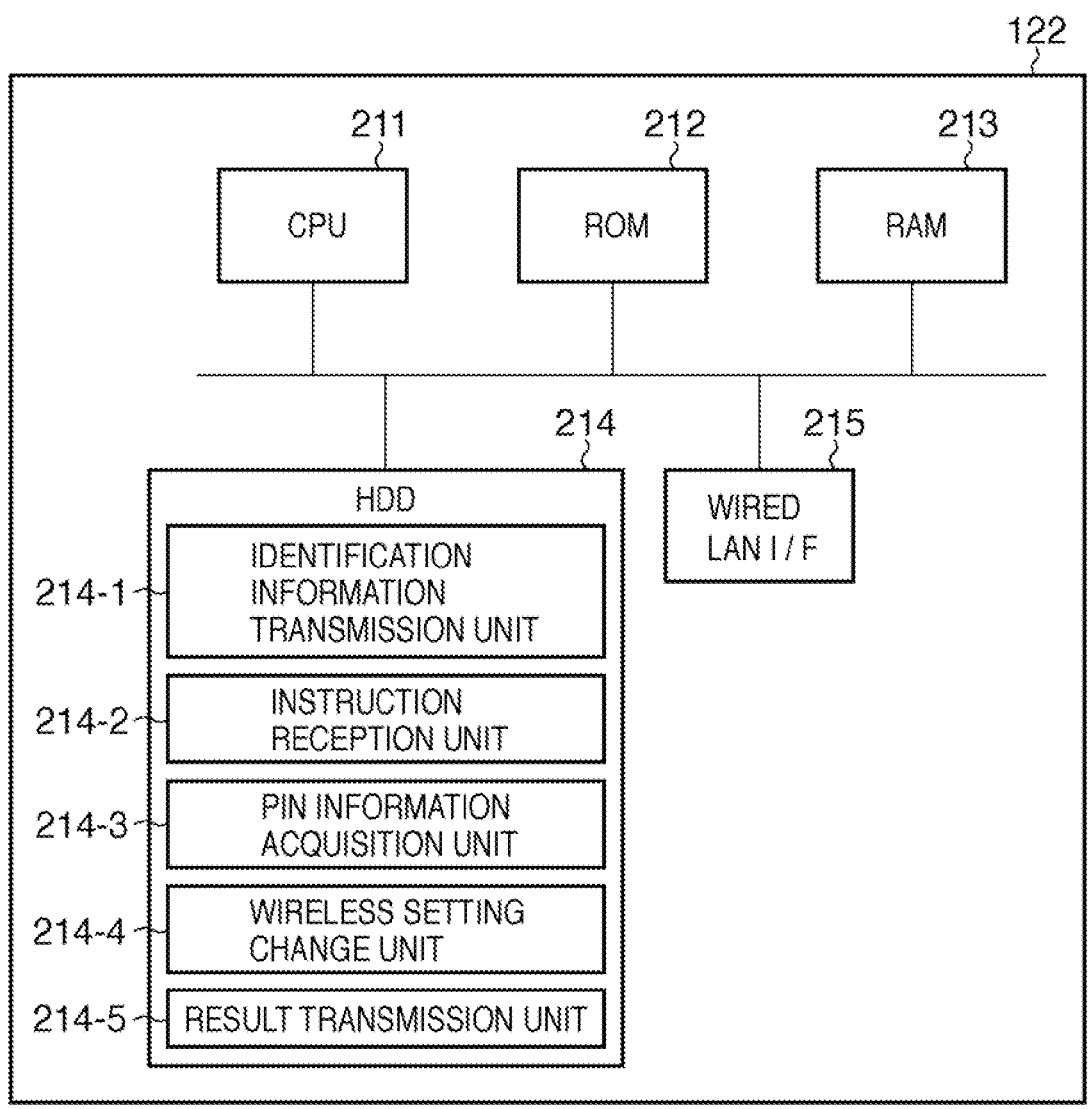
FIG. 2B is a block diagram showing the hardware arrangement of a parameter setting control apparatus 122.

Preferred embodiments of the present invention will now be described in detail in accordance with the accompanying drawings.

First Embodiment

<1. Configuration of Wireless Communication Local Network System>

FIG. 1 is a view showing the configuration of a wireless communication local network system 100 which comprises a communication resource management apparatus (communication control apparatus) according to an embodiment of the present invention.

As shown in FIG. 1, the wireless communication local network system 100 is configured using an IEEE 802.11-based wireless LAN 110 and a wired LAN 120.

The wireless LAN 110 comprises a wireless access point (AP) 111 which builds an independent wireless cell 110-1 (SSID=1) and a wireless access point 112 which builds an independent wireless cell 110-2 (SSID=2).

Reference numeral 113 denotes a wireless client terminal (STA) which stores streaming media data; and 114 and 115, wireless client terminals (STA) which comprise a playback function of the streaming media data. Note that the wireless client terminal (STA) 114 is located within the range of the independent wireless cell 110-1, and the wireless client terminals (STA) 113 and 115 are located within the overlap range of the independent wireless cells 110-1 and 110-2.

The wireless access points 111 and 112 are connected via a wired LAN switch 121. To the wired LAN switch 121, a parameter setting control apparatus 122, which sets parameter information in the wireless client terminals (STA) 113 to 115 located within the ranges of the independent wireless cells, is connected. Furthermore, a communication resource management apparatus 123, which manages communication resources of respective devices 111 to 115 that comprise the wireless LAN 110 by communicating with these devices, is connected.

The wired LAN switch 121 is connected to the Internet 141 via a gateway router 131. A streaming media server 161 is connected to the Internet 141 via a gateway router 151. In this way, the wireless client terminals (STA) 113 to 115 can access the streaming media server 161.

<2. Hardware Arrangements of Devices>
<2.1 Hardware Arrangement of Communication Resource Management Apparatus>

FIG. 2A is a block diagram showing the hardware arrangement of the communication resource management apparatus 123. A CPU 201 is a central processing unit which systematically controls the communication resource management apparatus 123 based on control programs stored in storage units such as a ROM 202, hard disk drive (HDD) 204, and the like.

A RAM 203 is a work area of the CPU 201, and temporarily stores data upon execution of the control programs.

The HDD 204 stores control programs required to implement a communication control method according to this embodiment. The control programs include a discovery processor 204-1 which collects identification information regarding the devices 111 to 115 which comprise the wireless communication local network system 100. Also, the control programs include a determination/control processor 204-2 which determines the wireless access point (AP) on which associations of the wireless client terminals are not concentrated, and controls switching of the independent wireless cells associated by the wireless client terminals. Furthermore, the control programs include an evaluation unit 204-3 which evaluates the switching control result of the independent wireless cells to be associated. Note that the wireless client terminal as a target of switching of the independent wireless cell to be associated is determined based on a priority order table 204-4.

A wired LAN I/F 205 is a communication circuit required to connect the communication resource management apparatus 123 to the wired LAN switch 121.

<2.2 Hardware Arrangement of Parameter Setting Control Apparatus>

FIG. 2B is a block diagram showing the hardware arrangement of the setting control apparatus 122. A CPU 211 is a central processing unit, which systematically controls the parameter setting control apparatus 122 based on control programs stored in storage units such as a ROM 212, hard disk drive (HDD) 214, and the like.

A RAM 213 is a work area of the CPU 211, and temporarily stores data during execution of the control programs.

The HDD 214 stores control programs required to update parameter information of the wireless client terminals 113 to 115 based on an instruction from the communication resource management apparatus 123.

The control programs include an identification information transmission unit 214-1 which transmits identification information in response to discovery processing of the communication resource management apparatus 123. Also, the control programs include an instruction reception unit 214-2 which receives a parameter information update instruction from the communication resource management apparatus 123, and a PIN information acquisition unit 214-3 which acquires PIN information for authentication required when updating the parameter information. Furthermore, the control programs include a wireless setting change unit 214-4 which is used to update the parameter information of a wireless client terminal designated by the communication resource management apparatus 123, and a result transmission unit 214-5 which transmits the change result to the communication resource management apparatus 123.

A wired LAN I/F 215 is a communication circuit required to connect the parameter setting control apparatus 122 to the wired LAN switch 121.

<2.3 Hardware Arrangement of Wireless Access Point>

Figure 2C:
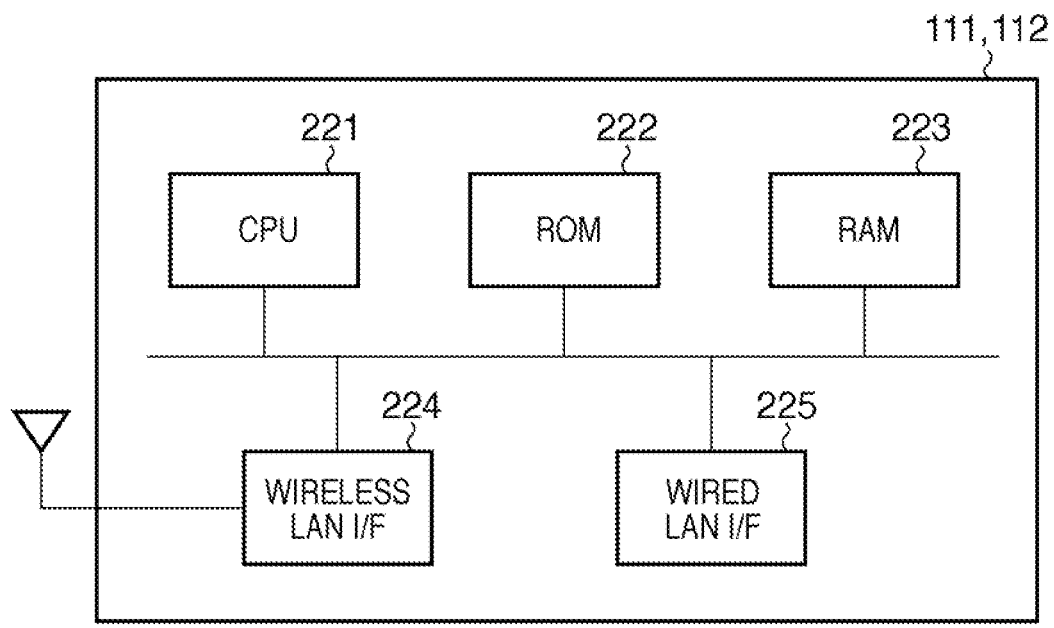
FIG. 2C is a block diagram showing the hardware arrangement of a wireless access point.

FIG. 2C is a block diagram showing the hardware arrangement of the wireless access points 111 and 112. A CPU 221 is a central processing unit, which systematically controls the wireless access point based on control programs stored in a storage unit such as a ROM 222 or the like. For example, the CPU 221 establishes wireless channels with wireless client terminals 113 to 115, and executes data transfer control between the wireless LAN 110 and wired LAN 120.

The ROM 222 is a storage unit that stores the control programs, and the like, and comprises an EEPROM or the like. A RAM 223 is a work area of the CPU 221, and temporarily stores data upon execution of the control programs. A wired LAN I/F 225 is a communication circuit required to connect the wireless access point 111 or 112 to the wired LAN 120.

A wireless LAN I/F 224 is a wireless communication circuit required to connect the wireless client terminals 113 to 115. Note that the ROM 222 stores an identification code for the wireless LAN 110 such as an SSID (Service Set IDentifier) or the like, and the wireless LAN I/F 224 periodically transmits that SSID.

<2.4 Hardware Arrangement of Wireless Client Terminal>

Figure 2D:
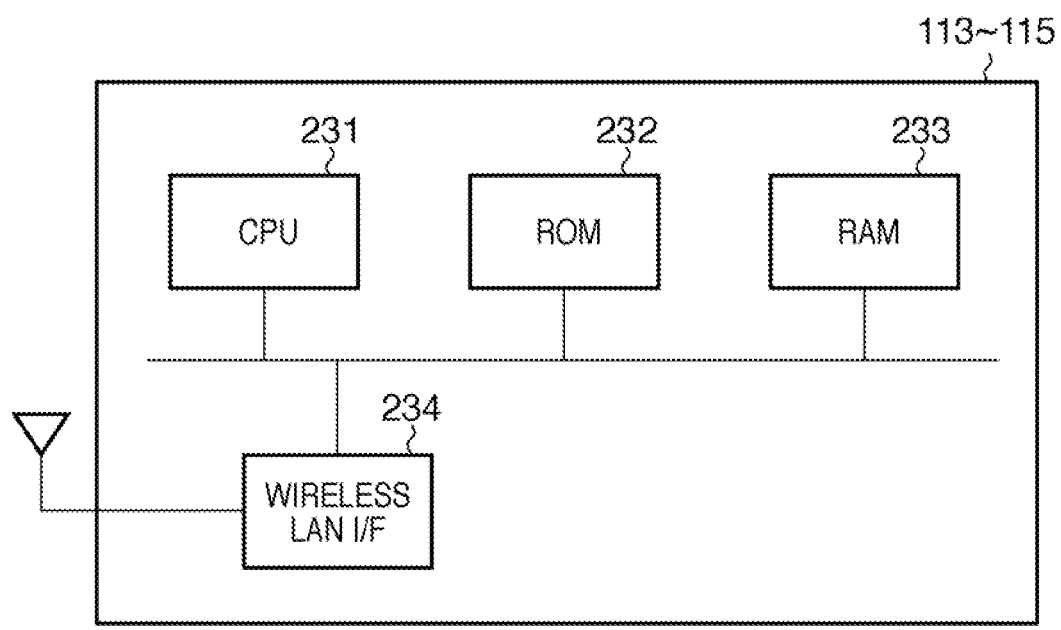
FIG. 2D is a block diagram showing the hardware arrangement of a wireless client terminal.

FIG. 2D is a block diagram showing the hardware arrangement of the wireless client terminals 113 to 115. A CPU 231 is a central processing unit, which systematically controls a corresponding one of the wireless client terminals 113 to 115 based on control programs stored in a storage unit such as a ROM 232 or the like. For example, the CPU 231 establishes a wireless channel with the wireless access point (AP) 111 or 112.

The ROM 232 is a storage unit that stores the control programs, and the like, and comprises an EEPROM or the like. A RAM 233 is a work area of the CPU 231, and temporarily stores data upon execution of the control programs. A wireless LAN I/F 234 is a wireless communication circuit required to connect the wireless access point (AP) 111 or 112.

<3. Sequence of Communication Control Processing in Wireless Communication Local Network System>

The sequence of communication control processing in the wireless communication local network system 100 will be described below. Prior to a description, assume that the wireless client terminal (STA) 114 associates with the independent wireless cell 110-1 built using the wireless access point 111. The sequence of the communication control processing executed when the wireless client terminals (STA) 113 and 115 associate with the independent wireless cell 110-1 built using the wireless access point 111 in this state will now be explained.

Figure 4:
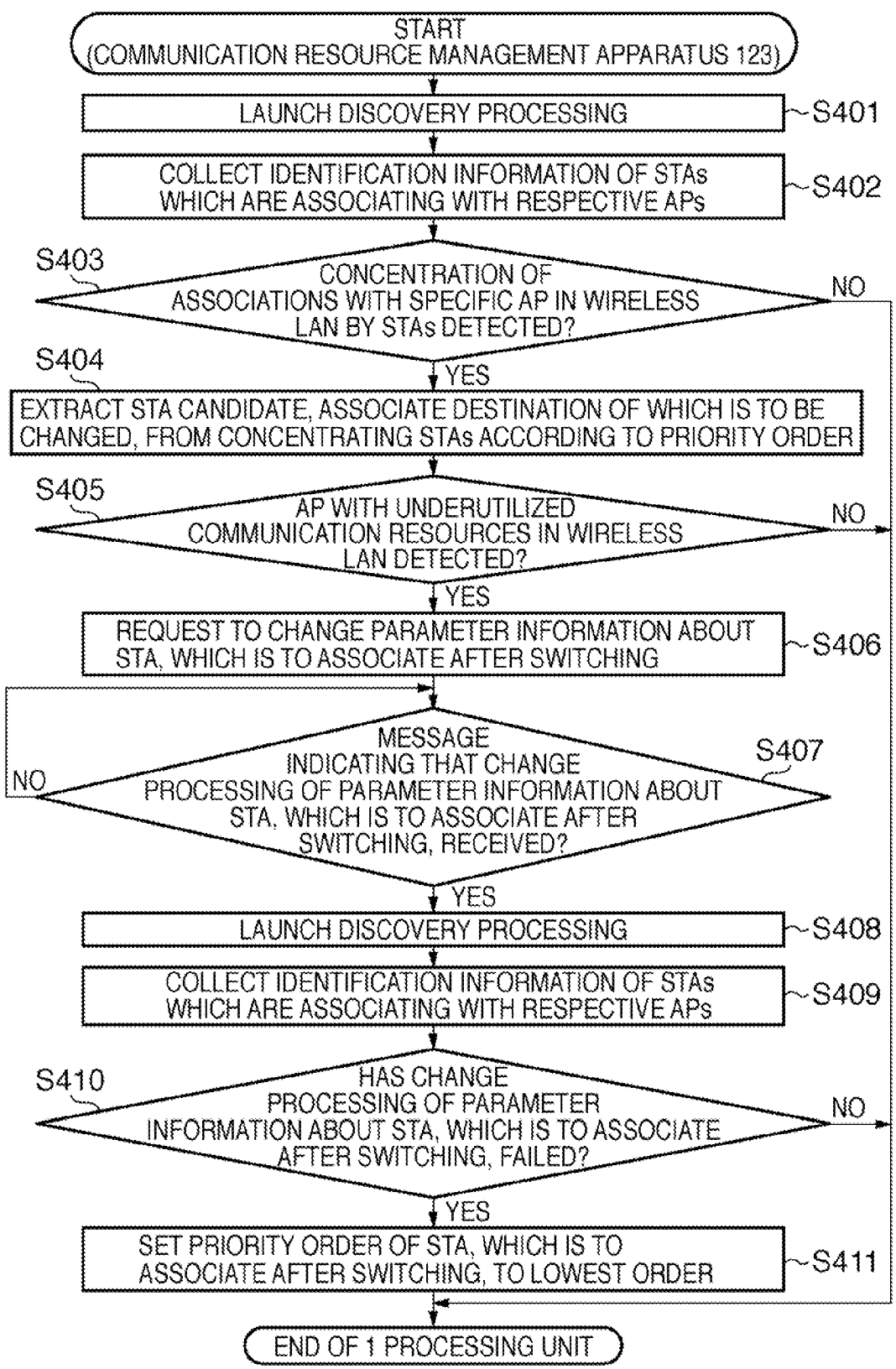
FIG. 4 is a flowchart showing the sequence of individual processing in the communication resource management apparatus 123.
Figure 5:
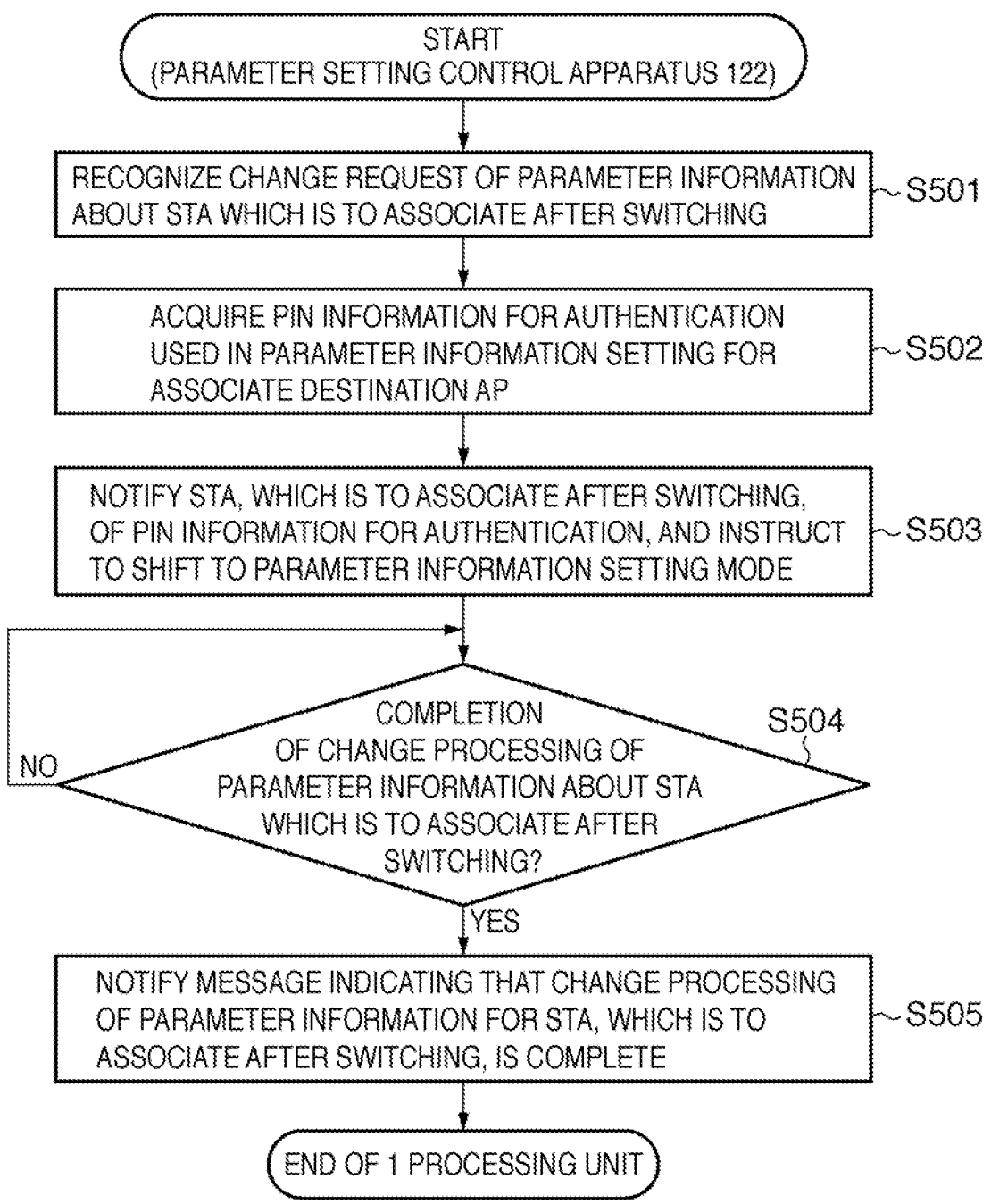
FIG. 5 is a flowchart showing the sequence of individual processing in the parameter setting control apparatus 122.
Figure 6:
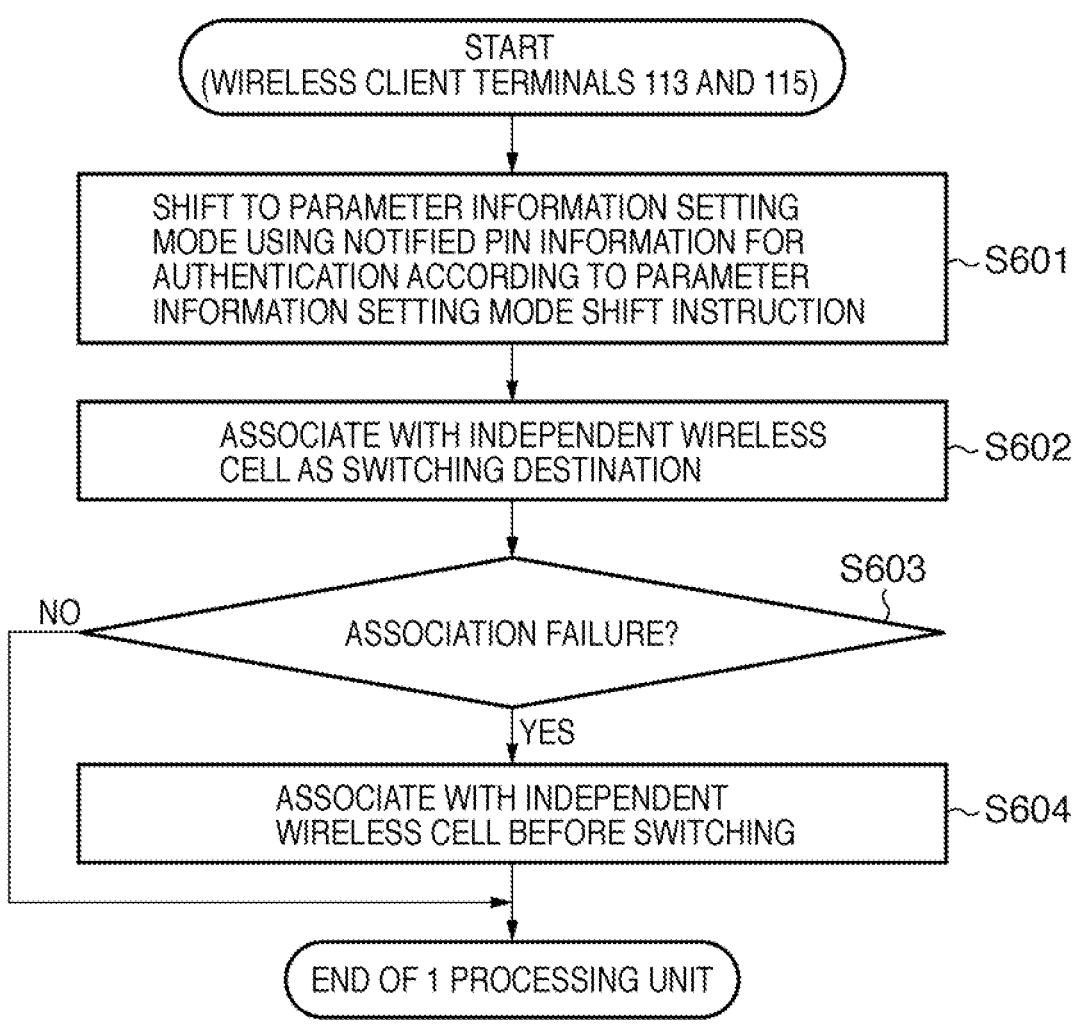
FIG. 6 is a flowchart showing the sequence of individual processing in wireless client terminals (STA) 114 and 115.

FIG. 3 is a flowchart showing the sequence of the overall communication control processing in the wireless communication local network system 100. FIGS. 4 to 6 are flowcharts showing the sequences of individual processing in the communication resource management apparatus 123, parameter setting control apparatus 122, and wireless client terminals (STA) 113 and 115. The sequence of the communication control processing will be described below with reference to FIGS. 3 to 6.

Initially, the communication resource management apparatus 123 launches discovery processing (305 in FIG. 3) for collecting identification information of the respective devices that comprise the wireless communication local network system 100 (step S401 in FIG. 4).

In this embodiment, assume that only the parameter setting control apparatus 122 and wireless access points 111 and 112 support the discovery processing. For this reason, an information request signal (301 in FIG. 3) used to collect identification information of the respective devices is transmitted to the parameter setting control apparatus 122 and wireless access points 111 and 112.

Upon reception of the information request signal (301 in FIG. 3), the parameter setting control apparatus 122 and wireless access points 111 and 112 return response signals (302 to 304 in FIG. 3) so as to transmit identification information accordingly. Note that the identification information transmitted from the wireless access point 111 includes that of the wireless client terminal (STA) 114 which associates with the independent wireless cell 110-1 built using the wireless access point 111.

The communication resource management apparatus 123 collects the identification information of wireless client terminals (STA) which are associating with the independent wireless cells 110-1 and 110-2 built using the wireless access points 111 and 112 by the discovery processing (step S402 in FIG. 4).

This embodiment assumes Discovery Description specified by UPnP® or LLTD specified by Windows® Rally® as a protocol used in the discovery processing. However, other protocols may be used upon collecting identification information. Note that UPnP is a short for Universal Plug and Play, and LLTD is a short for Link Layer Topology Discovery.

The communication resource management apparatus 123 checks based on the collected identification information if associations by the wireless client terminals are concentrated on an independent wireless cell built using a specific wireless access point in the wireless LAN 110 (step S403 in FIG. 4).

If it is determined in step S403 that associations by the wireless client terminals (STA) are not focused on the specific wireless access point (AP), the processing ends.

On the other hand, if it is determined that associations by the wireless client terminals (STA) are concentrated on the independent wireless cell built using the specific wireless access point (AP), the process advances to step S404 in FIG. 4.

In step S404, the communication resource management apparatus 123 extracts a candidate of a wireless client terminal (STA), which is to associate after switching, from the wireless client terminals (STA) which associate with the independent wireless cell built using the specific wireless access point. Upon extraction, the apparatus 123 refers to the priority order table 204-4 which specifies the priority order among the wireless client terminals (STA). In the example of FIG. 1, assume that wireless client terminals (STA) 113 and 115 are extracted as candidates.

Furthermore, the communication resource management apparatus 123 checks in step S405, based on the identification information collected in step S402, if a wireless access point (AP) with underutilized communication resources is found in the wireless LAN 110.

If it is determined in step S405 that no wireless access point with unused communication resources is found, the processing ends.

On the other hand, if it is determined in step S405 that a wireless access point with underutilized communication resources is found, the process advances to step S406. In step S406, the communication resource management apparatus 123 determines that the independent wireless cell built using the wireless access point with underutilized communication resources is the switching destination of the candidates of the wireless client terminals (STA). In the example of FIG. 1, assume that the independent wireless cell 110-2 built using the wireless access point 112 is determined as the switching destination of the wireless client terminals 113 and 115.

The communication resource management apparatus 123 transmits a change request instruction (306 in FIG. 3) to the parameter setting control apparatus 122 so as to change the parameter information set in the candidates of the wireless client terminals extracted in step S404 to that for the wireless access point (AP) used to build the independent wireless cell as the switching destination.

In the example of FIG. 1, the wireless client terminal (STA) 113 and wireless client terminal (STA) 115 are extracted as the candidates of the wireless client terminals which are to associate after switching. Hence, the communication resource management apparatus 123 transmits a change request instruction (306 in FIG. 3) to the parameter setting control apparatus 122 so that the wireless client terminals (STA) 113 and 115 execute switching processing to the independent wireless cell 110-2 built using the wireless access point 112 and then associate with that cell.

Upon transmitting the change request instruction (306 in FIG. 3) to the parameter setting control apparatus 122, the communication resource management apparatus 123 transmits the identification information of the wireless client terminals (STA) 113 and 115 which are to associate after switching. Furthermore, the apparatus 123 transmits the identification information of the wireless access point (AP) 112 that used to build the independent wireless cell 110-2 as the switching destination.

Note that a MAC address, IP address, UUID, or the like is assumed as the identification information of the wireless client terminal (STA) and wireless access point (AP). However, the present invention is not particularly limited to such specific information as long as information to be used allows the parameter setting control apparatus 122 to specify a device.

Upon reception of the change request instruction (306 in FIG. 3), the parameter setting control apparatus 122 recognizes that instruction (step S501 in FIG. 5). More specifically, the apparatus 122 recognizes the identification information of the wireless client terminals 113 and 115 which are to associate after switching, and that of the wireless access point (A) 112 which builds the independent wireless cell 110-2 as the switching destination.

The parameter setting control apparatus 122 acquires PIN information for authentication (authentication information) required to set the parameter information for the wireless access point 112 that used to build the independent wireless cell 110-2 as the switching destination in the wireless client terminals 113 and 115 (step S502 in FIG. 5).

The parameter setting control apparatus 122 transmits in-band messages (307 and 308 in FIG. 3) that request to shift to a parameter information setting mode to the wireless client terminals 113 and 115, which are to associate after switching (step S503 in FIG. 5). Also, the apparatus 122 transmits PIN information for authentication together.

Upon reception of the messages (307 and 308 in FIG. 3) that request to shift to the parameter information setting mode, the wireless client terminals 113 and 115 shift to the parameter information setting mode using the received PIN information for authentication (step S601 in FIG. 6).

After that, the parameter setting control apparatus 122 and wireless client terminals 113 and 115 execute change processing (309 to 311) of the parameter information using Wi-Fi Protected Setup®. As a result, the SSID set in the wireless client terminals (STA) 113 and 115 is changed from "1" to "2".

Note that this embodiment uses Wi-Fi Protected Setup® as a setting protocol of the parameter information, but the change processing can be implemented using other in-band parameter setting processes.

Upon completion of the change processing of the parameter information, the wireless client terminals (STA) 113 and 115 associate with the independent wireless cell as the switching destination (step S602 in FIG. 6).

Furthermore, the wireless client terminals 113 and 115 check in step S603 if their associations with the independent wireless cell 110-2 as the switching destination have succeeded. If it is determined in step S603 that the associations with the independent wireless cell 110-2 as the switching destination have failed, the process advances to step S604. In step S604, the wireless client terminals 113 and 115 return the set parameter information to the original information, and associate with the independent wireless cell 110-1 built using the wireless access point 111 before switching.

On the other hand, if it is determined in step S603 that the associations with the independent wireless cell as the switching destination have succeeded, the switching processing ends.

The parameter setting control apparatus 122 monitors whether or not the switching processing of the wireless client terminals 113 and 115 is complete (step S504 in FIG. 5). If it is determined that the switching processing is complete, the process advances to step S505.

In step S505, the parameter setting control apparatus 122 transmits a message indicating that the change processing of the parameter information for the wireless client terminals 113 and 115 is complete (312 in FIG. 3) to the communication resource management apparatus 123.

The communication resource management apparatus 123 monitors whether or not the message indicating that the change processing of the parameter information for the wireless client terminals 113 and 115 is complete is transmitted from the parameter setting control apparatus 122 (step S407 in FIG. 4). If it is determined that the communication resource management apparatus 123 receives that message, the process advances to step S408.

In step S408, the communication resource management apparatus 123 launches discovery processing (313 to 317 in FIG. 3) again. Since details of the discovery processing have been described above, a repetitive description thereof will be avoided.

In step S409, the communication resource management apparatus 123 collects identification information of the wireless client terminals (STA) which are associating with the independent wireless cells 110-1 and 110-2 built using the wireless access points 111 and 112 as a result of the discovery processing.

The communication resource management apparatus 123 checks in step S410 if the wireless client terminals 113 and 115 which are to associate after switching can associate with the independent wireless cell 110-2 as the switching destination.

More specifically, the communication resource management apparatus 123 checks if the wireless access point which builds the independent wireless cell with which the wireless client terminals 113 and 115 currently associate is the same as that which builds the independent wireless cell with which the wireless client terminals associated before transmission of the change request instruction.

If it is determined that the wireless access point is the same as that before transmission of the change request instruction, the communication resource management apparatus 123 determines in step S410 that the switching processing of the wireless client terminals has failed, and sets the priority order of these wireless client terminals in the priority order table 204-4 to be the lowest order.

On the other hand, if it is determined that the wireless access point is different from that before transmission of the change request instruction, the communication resource management apparatus 123 determines in step S410 that the switching processing of the wireless client terminals has succeeded, thus ending the processing.

As can be seen from the above description, in this embodiment, the communication resource management apparatus is arranged in the wireless communication local network system to manage the communication resources of the wireless access points. As a result, the need for monitoring the communication resources of the wireless access point for each wireless client terminal can be obviated.

Furthermore, when associations are concentrated on the independent wireless cell built using the specific wireless access point, the communication resource management apparatus detects this. When such concentration is detected, the communication resource management apparatus extracts a wireless access point with a light processing load from those which build the wireless LAN. Furthermore, the apparatus extracts the wireless client terminals which are to associate with the independent wireless cell built using the wireless access point with the light processing load after switching to that cell.

In this way, the wireless client terminal can switch the current independent wireless cell and associate with an appropriate independent wireless cell in accordance with the states of the communication resources for respective wireless access points recognized by the communication resource management apparatus side.

Since the communication resource management apparatus is periodically launched, good load balancing of the wireless client terminals over the independent wireless cells can be realized.

Second Embodiment

In the first embodiment, when the communication resource management apparatus detects concentration of the associations of the wireless client terminals on the independent wireless cell built using the specific wireless access point, the apparatus controls to switch to another independent wireless cell.

However, the present invention is not limited to this. For example, when the wireless client terminal wants to receive the provision of a new communication service, it may be controlled to associate after switching in advance in consideration of a communication resource amount required to receive the service.

<1. Configuration of Wireless Communication Local Network System>

The configuration of a wireless communication local network system to which a communication resource management apparatus according to this embodiment is applied is the same as the first embodiment, and a repetitive description thereof will be avoided.

<2. Sequence of Communication Control Processing in Wireless Communication Local Network System>

The sequence of the communication control processing of this embodiment in the wireless communication local network system 100 will be described below.

Prior to a description, assume that the wireless client terminals (STA) 113 to 115 associate with the independent wireless cell 110-1 built using the wireless access point 111.

Also, assume that the wireless client terminal (STA) 114 of the wireless client terminals (STA) 113 to 115 accesses the streaming media server 161 and receives the provision of a playback service of streaming media data. This embodiment will explain the sequence of the communication control processing when the wireless client terminals 113 and 115 want to receive the provision of the playback service of streaming media data.

Note that the wireless client terminals (STA) 113 to 115 have a function of requesting a use frequency band to the communication resource management apparatus 123.

Figure 7:
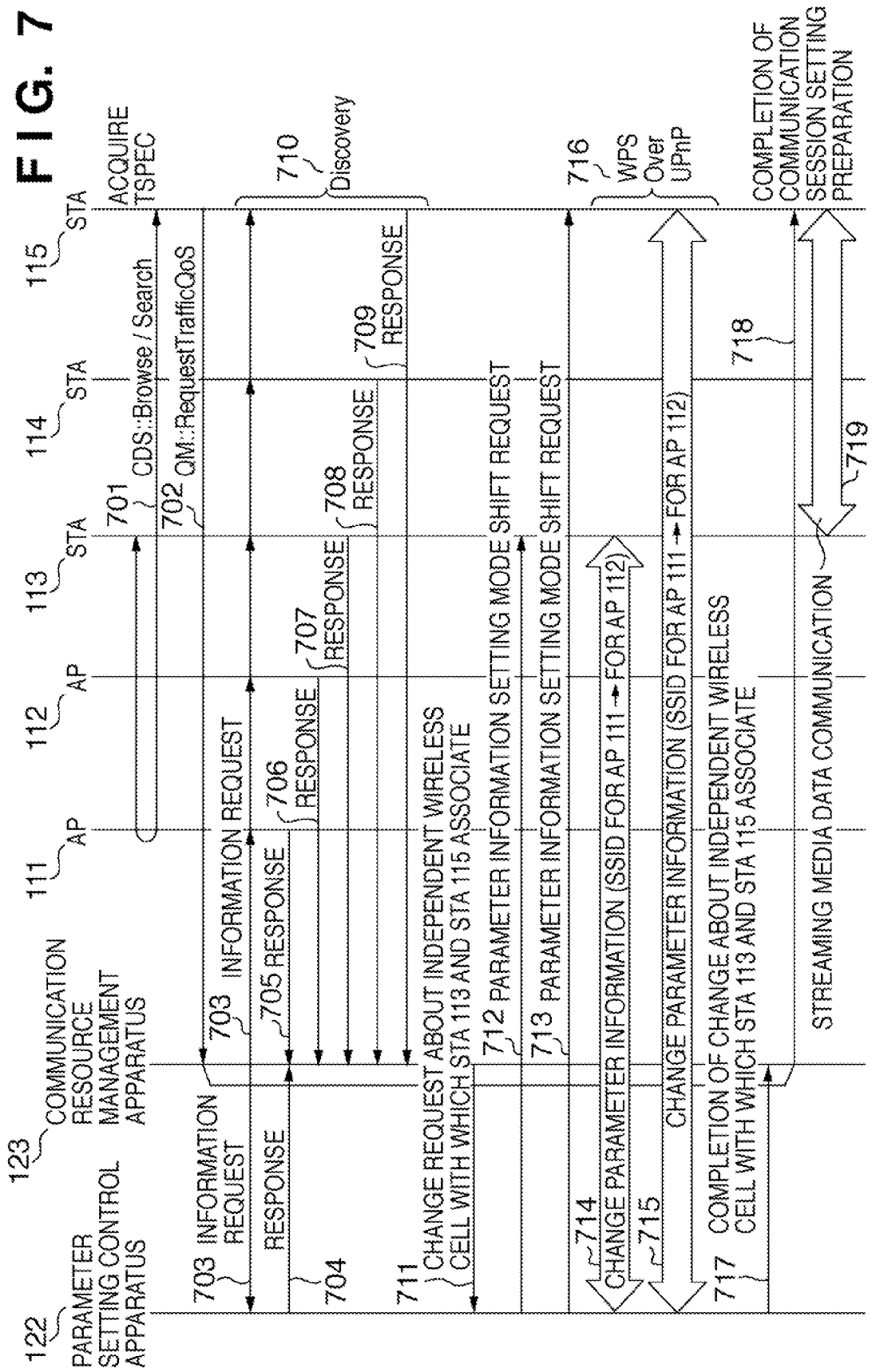
FIG. 7 is a flowchart showing the sequence of the overall communication control processing according to the second embodiment in the wireless communication local network system 100.
Figure 8:
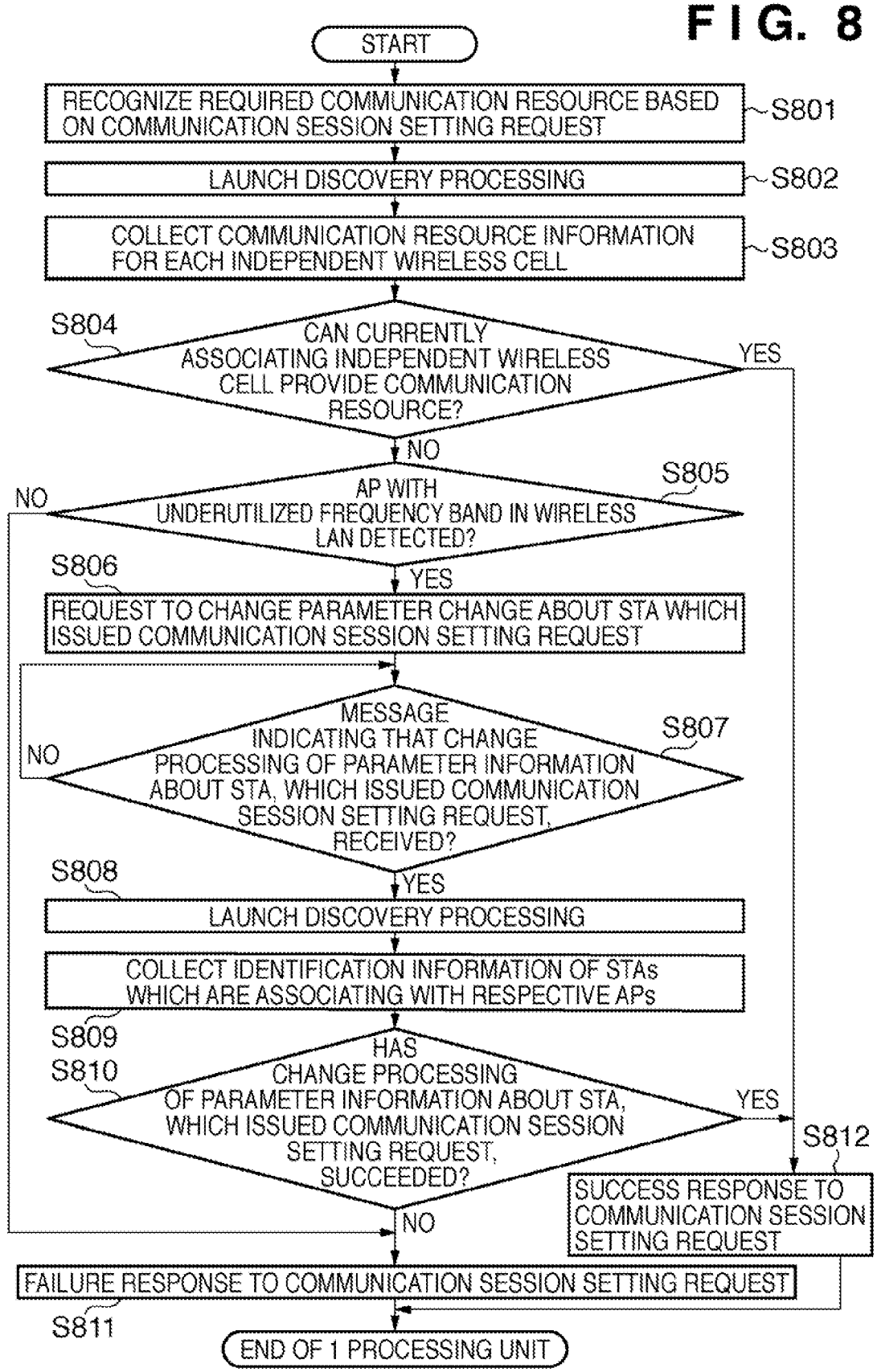
FIG. 8 is a flowchart showing the sequence of individual processing in the communication resource management apparatus 123.

FIG. 7 is a flowchart showing the sequence of the overall communication control processing of this embodiment in the wireless communication local network system 100. FIG. 8 is a flowchart showing the sequence of individual processing in the communication resource management apparatus 123. Note that the sequences of processing in the parameter setting control apparatus 122 and the wireless client terminals (STA) 113 to 115 are basically the same as those in the first embodiment, and a description using the drawings will not be given.

Initially, the wireless access point 111 acquires information (TSPEC) used to calculate the resource amount required to receive the provision of the playback service from the wireless client terminals 113 and 115 which receive the provision of the playback service of streaming media data.

For this purpose, the wireless access point 111 launches a message sequence, and transmits an instruction that requests the wireless client terminals (STA) 113 and 115 to transmit TSPEC (701 in FIG. 7).

The wireless client terminals 113 and 115 transmit the TSPEC to the communication resource management apparatus 123, and issue a communication session setting request that requests to assure the resource amount required to receive the provision of the playback service of streaming media data (702 in FIG. 7).

The communication resource management apparatus 123 recognizes the required resource amount in response to the communication session setting requests transmitted from the wireless client terminals (STA) 113 and 115 (step S801 in FIG. 8).

Note that this embodiment assumes UPnP AV and UPnP QoS specified by UPnP® as protocols used in these processes, but other protocols may be used. Note that UPnP is a short for Universal Plug and Play.

After the communication resource management apparatus 123 recognizes the resource amount required for the wireless client terminals (STA) 113 and 115 to receive the provision of the playback service of streaming media data, it launches discovery processing (step S802 in FIG. 8). The communication resource management apparatus 123 collects communication resource information of the respective devices which comprise the wireless communication local network system 100 by the discovery processing.

Note that in this embodiment, the parameter setting control apparatus 122, wireless access points 111 and 112, and wireless client terminals 113 to 115 support the discovery processing. For this reason, an information request signal (703 in FIG. 7) used to collect the communication resource information of the respective devices are transmitted to the parameter setting control apparatus 122, wireless access points 111 and 112, and wireless client terminals 113 to 115.

Upon reception of the information request signal (703 in FIG. 7), the parameter setting control apparatus 122, wireless access points 111 and 112, and the like return response signals (704 to 709 in FIG. 7) so as to transmit communication resource information accordingly.

In this way, the communication resource management apparatus 123 can collect the communication resource information for respective independent wireless cells (step S803 in FIG. 8).

This embodiment assumes Discovery Description specified by UPnP® or LLTD specified by Windows® Rally® as a protocol used in the discovery processing. However, other protocols may be used upon collecting communication resource information. Note that UPnP is a short for Universal Plug and Play, and LLTD is a short for Link Layer Topology Discovery.

The communication resource management apparatus 123 checks based on the collected communication resource information if the currently associating independent wireless cell can provide the resource amount required to receive the provision of the playback service of streaming media data (step S804).

If it is determined that the independent wireless cell can provide the required resource amount, the communication resource management apparatus 123 transmits a signal indicating that the setting of a communication session has succeeded as a response signal (718 in FIG. 7) to the communication session setting requests from the wireless client terminals 113 and 115 (step S812 in FIG. 8).

In this case, since preparation for the communication session setting is completed between the wireless access point 111 and wireless client terminals 113 and 115, a communication of streaming media data starts (719 in FIG. 7).

On the other hand, if it is determined that the independent wireless cell cannot provide the required resource amount, the process advances to step S805 to check based on the collected communication resource information if a wireless access point with underutilized communication resources is found in the wireless LAN 110.

If it is determined in step S805 that no wireless access point with underutilized communication resources is found, the process jumps to step S811. In step S811, the communication resource management apparatus 123 transmits a signal indicating that the setting of a communication session has failed as a response signal (718 in FIG. 7) to the communication session setting requests from the wireless client terminals 113 and 115 (step S811 in FIG. 8).

On the other hand, if it is determined in step S805 that the wireless access point with underutilized communication resources is found, the process advances to step S806. In step S806, the communication resource management apparatus 123 recognizes an independent wireless cell built using the wireless access point with underutilized communication resources as a switching destination. Then, the apparatus 123 transmits a change request instruction (711 in FIG. 7) to the parameter setting control apparatus 122 so as to change the parameter information of the wireless client terminals (STA) 113 and 115 that receive the provision of the playback service to that for the wireless access point that used to build the independent wireless cell as the switching destination.

In this embodiment, assume that the wireless access point 112 is determined as a wireless access point with underutilized communication resources. Hence, the communication resource management apparatus 123 transmits the change request instruction (711 in FIG. 7) to the parameter setting control apparatus 122 so that the wireless client terminals 113 and 115 execute switching processing to the independent wireless cell 110-2 built using the wireless access point 112 and then associate with that cell.

Upon transmitting the change request instruction (711 in FIG. 7) to the parameter setting control apparatus 122, the communication resource management apparatus 123 transmits the identification information of the wireless client terminals 113 and 115 which are to receive the playback service of the streaming media data. Furthermore, the apparatus 123 transmits the identification information of the wireless access point 112 which builds the independent wireless cell 110-2 as the switching destination together.

Note that a MAC address, IP address, UUID, or the like is supposed as the identification information of the wireless client terminal and wireless access point. However, the present invention is not particularly limited to such specific information as long as information to be used allows the parameter setting control apparatus 122 to specify a device.

Upon reception of the change request instruction (711 in FIG. 7), the parameter setting control apparatus 122 recognizes the identification information of the wireless client terminals 113 and 115, which are to associate after switching, and that of the wireless access point 112 which builds the independent wireless cell as the switching destination.

After the parameter setting control apparatus 122 recognizes the change request instruction, it acquires PIN information for authentication required to set the parameter information for the wireless access point 112 that used to build the independent wireless cell as the switching destination in the wireless client terminals.

The parameter setting control apparatus 122 transmits in-band messages (712 and 713 in FIG. 7) that request to shift to a parameter information setting mode to the wireless client terminals 113 and 115, which are to associate after switching. Also, the apparatus 122 transmits PIN information for authentication together.

Upon reception of the messages (712 and 713 in FIG. 7) that request to shift to the parameter information setting mode, the wireless client terminals 113 and 115 shift to the parameter information setting mode using the PIN information for authentication received together with the messages.

After that, the parameter setting control apparatus 122 and wireless client terminals 113 and 115 execute parameter information setting processing (714 to 716) using Wi-Fi Protected Setup®. As a result, the SSID set in the wireless client terminals 113 and 115 is changed from "1" to "2".

Note that this embodiment uses Wi-Fi Protected Setup® as a setting protocol of the parameter information, but the setting processing can be implemented using other in-band parameter setting processes.

It is then checked if the wireless client terminals 113 and 115 successfully associate with the independent wireless cell 110-2 as the switching destination. If it is determined that the associations with the independent wireless cell 110-2 as the switching destination have failed, the parameter information set in each of the wireless client terminals 113 and 115 is restored to the previous parameter information, and the wireless client terminals 113 and 115 associate with the independent wireless cell 110-1 before switching.

On the other hand, if it is determined that the associations with the independent wireless cell 110-2 as the switching destination have succeeded, the switching processing ends.

The parameter setting control apparatus 122 monitors if the switching processing by the wireless client terminals 113 and 115 is complete. If it is determined that the switching processing is complete, the apparatus 122 transmits a message (717 in FIG. 7) indicating that the change processing of the parameter information for the wireless client terminals 113 and 115 is complete to the communication resource management apparatus 123.

The communication resource management apparatus 123 monitors if the message indicating that the change processing of the parameter information for the wireless client terminals 113 and 115 is complete is transmitted from the parameter setting control apparatus 122 (step S807 in FIG. 8). If it is determined that the communication resource management apparatus 123 receives the message, the process advances to step S808.

In step S808, the communication resource management apparatus 123 launches the discovery processing again. Since details of the discovery processing have been described above, a repetitive description thereof will be avoided.

In step S809, the communication resource management apparatus 123 collects identification information of the wireless client terminals (STA) which are associating with the independent wireless cells built using the wireless access points 111 and 112 as a result of the discovery processing.

The communication resource management apparatus 123 checks in step S810 if the wireless client terminals 113 and 115 which are to associate after switching are associated with the independent wireless cell as the switching destination.

More specifically, the communication resource management apparatus 123 checks if the independent wireless cell with which the wireless client terminals 113 and 115 currently associate is the same as that with which these terminals associated before transmission of the change request instruction.

If it is determined that the current independent wireless cell is the same as that before transmission of the change request instruction, the communication resource management apparatus 123 determines in step S810 that the switching processing of the wireless client terminals has failed, and the process advances to step S811.

In step S811, the communication resource management apparatus 123 transmits a signal indicating that the setting of a communication session has failed (indicating that required communication resources cannot be assured) as a response signal (718 in FIG. 7) to the communication session setting requests from the wireless client terminals 113 and 115.

On the other hand, if it is determined in step S810 that the current independent wireless cell is different from that before transmission of the change request instruction, the communication resource management apparatus 123 determines that the switching processing of the wireless client terminals has succeeded, and transmits a signal indicating that the setting of a communication session has succeeded as a response signal (718 in FIG. 7) to the communication session setting requests.

In this case, since preparation for the communication session setting is complete between the wireless access point 112 and wireless client terminals 113 and 115, a communication of streaming media data starts (719 in FIG. 7).

As can be seen from the above description, in this embodiment, when the wireless client terminal receives the provision of a new communication service, the current independent wireless cell can be switched to another independent wireless cell as needed in consideration of the resource amount required to receive the provision of the service.

Third Embodiment

The second embodiment has explained the case in which when the wireless client terminal wants to receive the provision of a new communication service, the current independent wireless cell is switched to another independent wireless cell as needed in consideration of the amount of resource, and that wireless client terminal associates with the switched cell. However, the present invention is not limited to this. For example, when the wireless client terminal which has already received the provision of the communication service requests to release the reception of that service, the current independent wireless cell may be switched to another independent wireless cell as needed in response to that release request, and that wireless client terminal may associate with the switched cell.

<1. Configuration of Wireless Communication Local Network System>

The configuration of a wireless communication local network system to which a communication resource management apparatus according to this embodiment is applied is the same as the first embodiment, and a repetitive description thereof will be avoided.

<2. Sequence of Communication Control Processing in Wireless Communication Local Network System>

The sequence of the communication control processing of this embodiment in the wireless communication local network system 100 will be described below.

Prior to a description, assume that the wireless client terminals (STA) 113 to 115 associate with the independent wireless cell 110-1 built using the wireless access point 111.

Also, assume that the wireless client terminals (STA) 113 to 115 which associate with the independent wireless cell 110-1 access the streaming media server 161 and receive the provision of a playback service of streaming media data.

This embodiment will explain the sequence of the communication control processing when the wireless client terminals 113 and 115 want to release the reception of the playback service of streaming media data.

Note that the wireless client terminals (STA) 113 to 115 have a function of requesting release of a use frequency band to the communication resource management apparatus 123.

Figure 9:
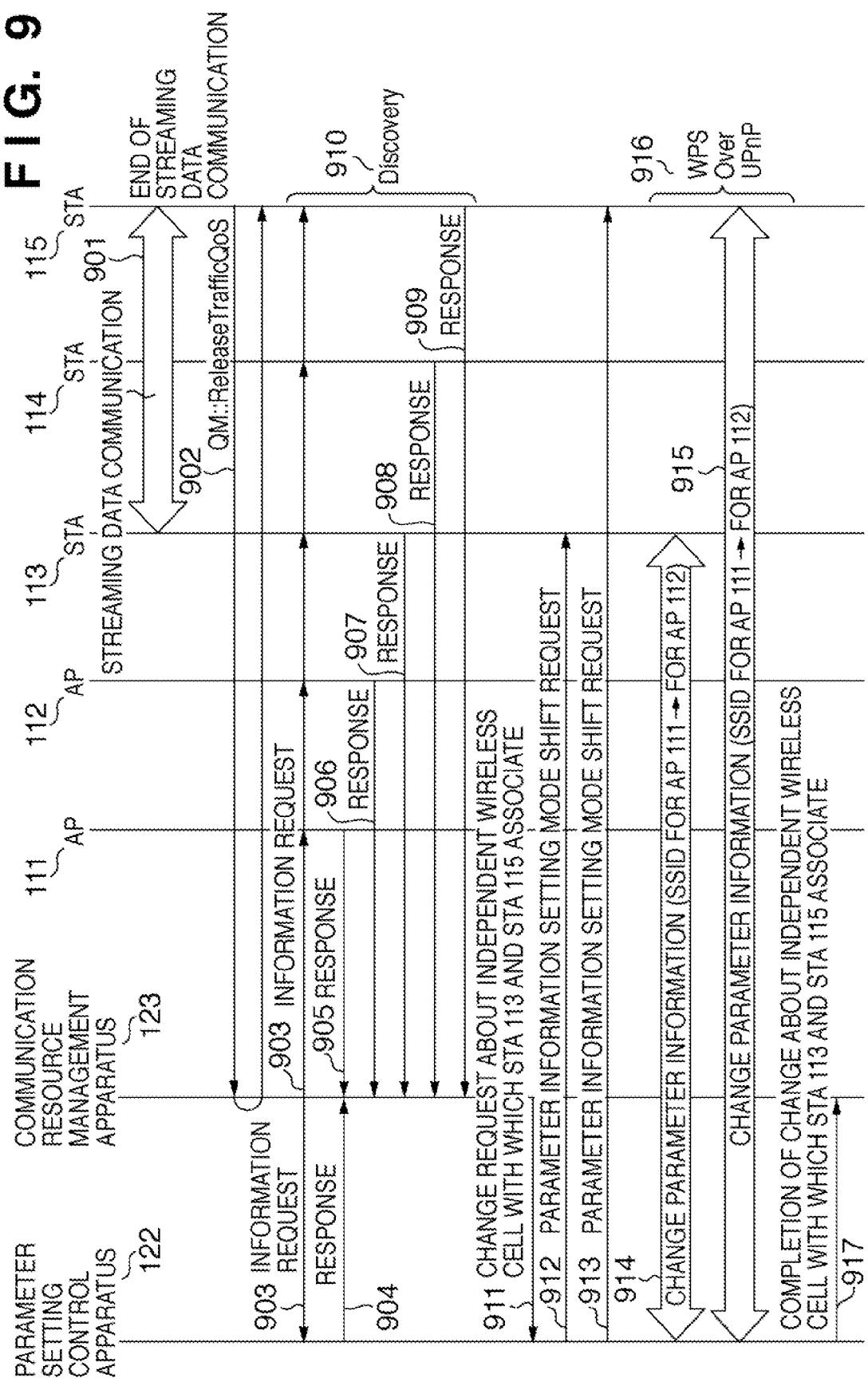
FIG. 9 is a flowchart showing the sequence of the overall communication control processing according to the third embodiment in the wireless communication local network system 100.
Figure 10:
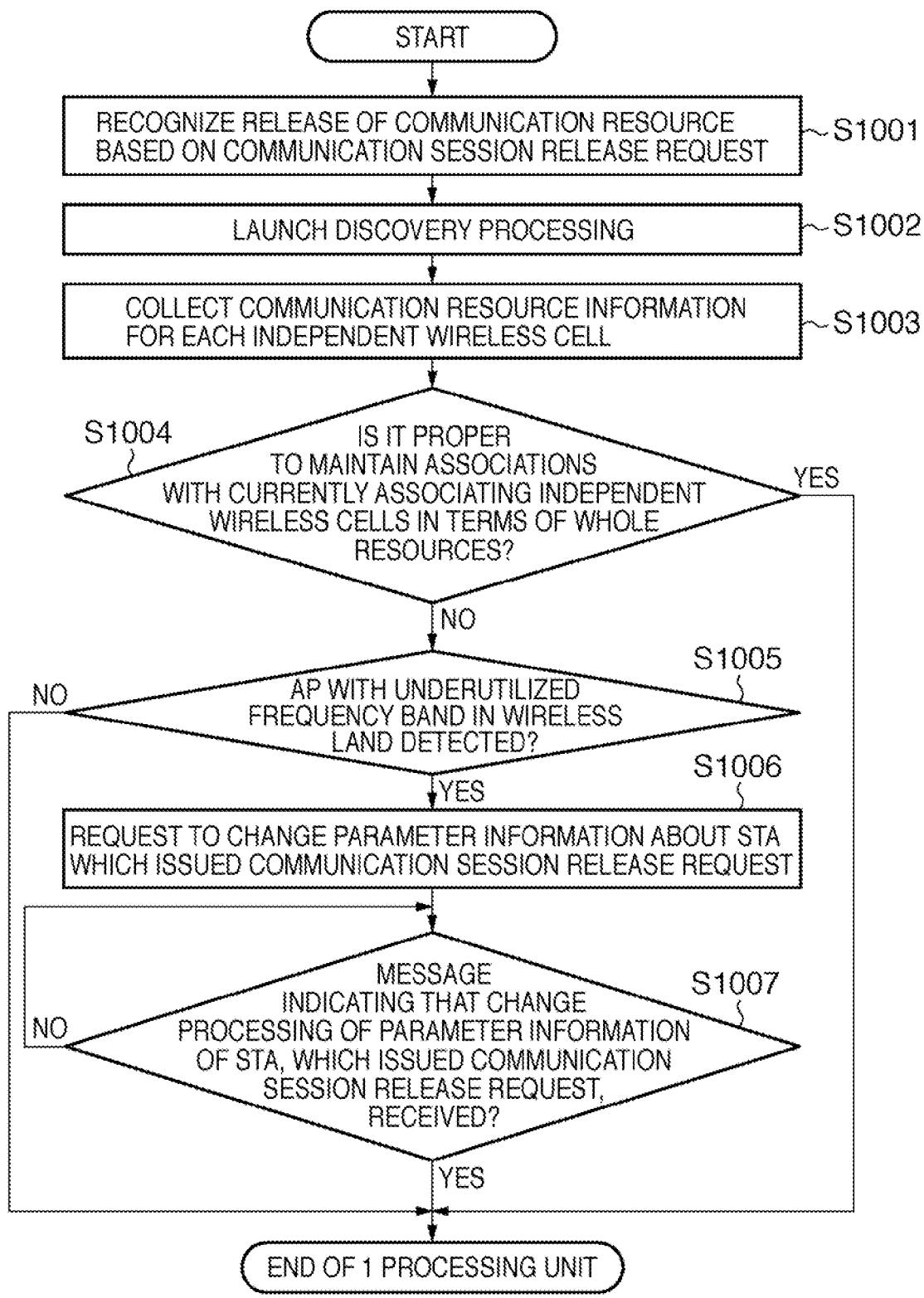
FIG. 10 is a flowchart showing the sequence of individual processing in the communication resource management apparatus 123.

FIG. 9 is a flowchart showing the sequence of the overall communication control processing of this embodiment in the wireless communication local network system 100. FIG. 10 is a flowchart showing the sequence of individual processing in the communication resource management apparatus 123. Note that the sequences of processing in the parameter setting control apparatus 122 and the wireless client terminals (STA) 113 to 115 are basically the same as those in the first embodiment, and a description using the drawings will not be given.

Initially, the wireless client terminals 113 and 115 which receive the provision of the playback service (901 in FIG. 9) transmit a communication session release request (902 in FIG. 9) so as to request to release communication resources used to receive the provision of the playback service.

Note that this embodiment assumes UPnP (Universal Plug and Play) QoS specified by UPnP® as a protocol used to transmit the communication session release request. However, other protocols may be used.

In step S1001 (FIG. 10), the communication resource management apparatus 123 receives the communication session release requests (902 in FIG. 9) from the wireless client terminals 113 and 115. As a result, the communication resource management apparatus 123 recognizes that communication resources used by the wireless client terminals 113 and 115 to receive the provision of the playback service are released.

After the communication resource management apparatus 123 recognizes that the communication resources are released, it launches discovery processing (910) so as to collect communication resource information of the respective devices which comprise the wireless communication local network system 100 (step S1002 in FIG. 10).

Note that in this embodiment, the parameter setting control apparatus 122, wireless access points 111 and 112, and wireless client terminals 113 to 115 support the discovery processing. For this reason, an information request signal (903 in FIG. 9) used to collect the communication resource information of the respective devices are transmitted to the parameter setting control apparatus 122, wireless access points 111 and 112, and wireless client terminals 113 to 115.

Upon reception of the information request signal (903 in FIG. 9), the parameter setting control apparatus 122, wireless access points 111 and 112, and the like return response signals (904 to 909 in FIG. 9) so as to transmit communication resource information accordingly.

In this way, the communication resource management apparatus 123 can collect the communication resource information for respective independent wireless cells (step S1003 in FIG. 10).

This embodiment assumes Discovery Description specified by UPnP® or LLTD specified by Windows® Rally® as a protocol used in the discovery processing. However, other protocols may be used upon collecting communication resource information.

The communication resource management apparatus 123 checks based on the collected communication resource information if it is proper to maintain the current association states with the independent wireless cells in terms of the balance of the communication resources of the whole system (step S1004 in FIG. 10).

If it is determined in step S1004 that it is proper to maintain the current association states, the communication resource management apparatus 123 maintains the current association states with the independent wireless cells.

On the other hand, if it is determined in step S1004 that it is not proper to maintain the current association states, the communication resource management apparatus 123 checks if a wireless access point with underutilized communication resources is found in the wireless LAN 110, so as to improve the balance of the communication resources (step S1005 in FIG. 10).

If it is determined in step S1005 that no wireless access point with underutilized communication resources is found, the processing ends.

On the other hand, if it is determined in step S1005 that the wireless access point with underutilized communication resources is found, the communication resource management apparatus 123 recognizes an independent wireless cell built using that wireless access point as a switching destination. Then, the apparatus 123 transmits a change request instruction (911 in FIG. 9) to the parameter setting control apparatus 122 so as to change the parameter information of the wireless client terminals 113 and 115 that release the reception of the playback service to that for the wireless access point that used to build the independent wireless cell recognized as the switching destination.

In this embodiment, assume that the wireless access point 112 is determined as a wireless access point with underutilized communication resources. Hence, the communication resource management apparatus 123 transmits the change request instruction (911 in FIG. 9) to the parameter setting control apparatus 122 so that the wireless client terminals 113 and 115 execute switching processing to the independent wireless cell 110-2 built using the wireless access point 112 and then associate with that cell.

Upon transmitting the change request instruction (911 in FIG. 9) to the parameter setting control apparatus 122, the communication resource management apparatus 123 transmits the identification information of the wireless client terminals 113 and 115 which are to release the reception of the playback service of the streaming media data. Furthermore, the apparatus 123 transmits the identification information of the wireless access point 112 which builds the independent wireless cell as the switching destination together.

Note that a MAC address, IP address, UUID, or the like is assumed as the identification information of the wireless client terminal and wireless access point. However, the present invention is not particularly limited to such specific information as long as information to be used allows the parameter setting control apparatus 122 to specify a device.

Upon reception of the change request instruction (911 in FIG. 9), the parameter setting control apparatus 122 recognizes the identification information of the wireless client terminals 113 and 115, which are to associate after switching, and that of the wireless access point 112 which builds the independent wireless cell as the switching destination.

After the parameter setting control apparatus 122 recognizes the change request instruction, it acquires PIN information for authentication required to set the parameter information for the wireless access point 112 that used to build the independent wireless cell as the switching destination in the wireless client terminals.

The parameter setting control apparatus 122 transmits in-band messages (912 and 913 in FIG. 9) that request to shift to a parameter information setting mode to the wireless client terminals 113 and 115, which are to associate after switching. Also, the apparatus 122 transmits PIN information for authentication together.

Upon reception of the messages (912 and 913 in FIG. 9) that request to shift to the parameter information setting mode, the wireless client terminals 113 and 115 shift to the parameter information setting mode using the PIN information for authentication received together with the messages.

After that, the parameter setting control apparatus 122 and wireless client terminals 113 and 115 execute parameter information setting processing (914 to 916) using Wi-Fi Protected Setup®. As a result, the SSID set in the wireless client terminals 113 and 115 is changed from "1" to "2".

Note that this embodiment uses Wi-Fi Protected Setup® as a setting protocol of the parameter information, but the setting processing can be implemented using other in-band parameter setting processes.

It is then checked if the wireless client terminals 113 and 115 successfully associate with the independent wireless cell 110-2 as the switching destination. If it is determined that the associations with the wireless access point 112 that used to build the independent wireless cell 110-2 as the switching destination have failed, the parameter information is returned to the original information, and the wireless client terminals associate with the independent wireless cell before switching.

On the other hand, if it is determined that the associations with the independent wireless cell as the switching destination have succeeded, the switching processing ends.

The parameter setting control apparatus 122 monitors if the switching processing by the wireless client terminals 113 and 115 is complete. If it is determined that the switching processing is complete, the apparatus 122 transmits a message (917 in FIG. 9) indicating that the change processing of the parameter information for the wireless client terminals 113 and 115 is complete to the communication resource management apparatus 123.

The communication resource management apparatus 123 monitors if the message indicating that the change processing of the parameter information for the wireless client terminals 113 and 115 is complete is transmitted from the parameter setting control apparatus 122 (step S1007 in FIG. 10).

As can be seen from the above description, in this embodiment, when the wireless client terminal that receives the provision of a communication service requests to release that reception, the balance of the communication resources in the wireless communication local network system is readjusted in response to that release request. As a result, the independent wireless cell with which the wireless client terminal currently associates with can be switched as needed, and the communication resources in the wireless communication local network system can be optimally distributed.

Fourth Embodiment

The first to third embodiments have explained the communication control processing premised on the wireless communication local network system shown in FIG. 1. However, a system to which a communication control apparatus according to the present invention is applicable is not limited to such specific system.

Hence, communication control processing in a wireless communication local network system shown in FIG. 11 will be described below.

<1. Configuration of Wireless Communication Local Network System>

Figure 11:
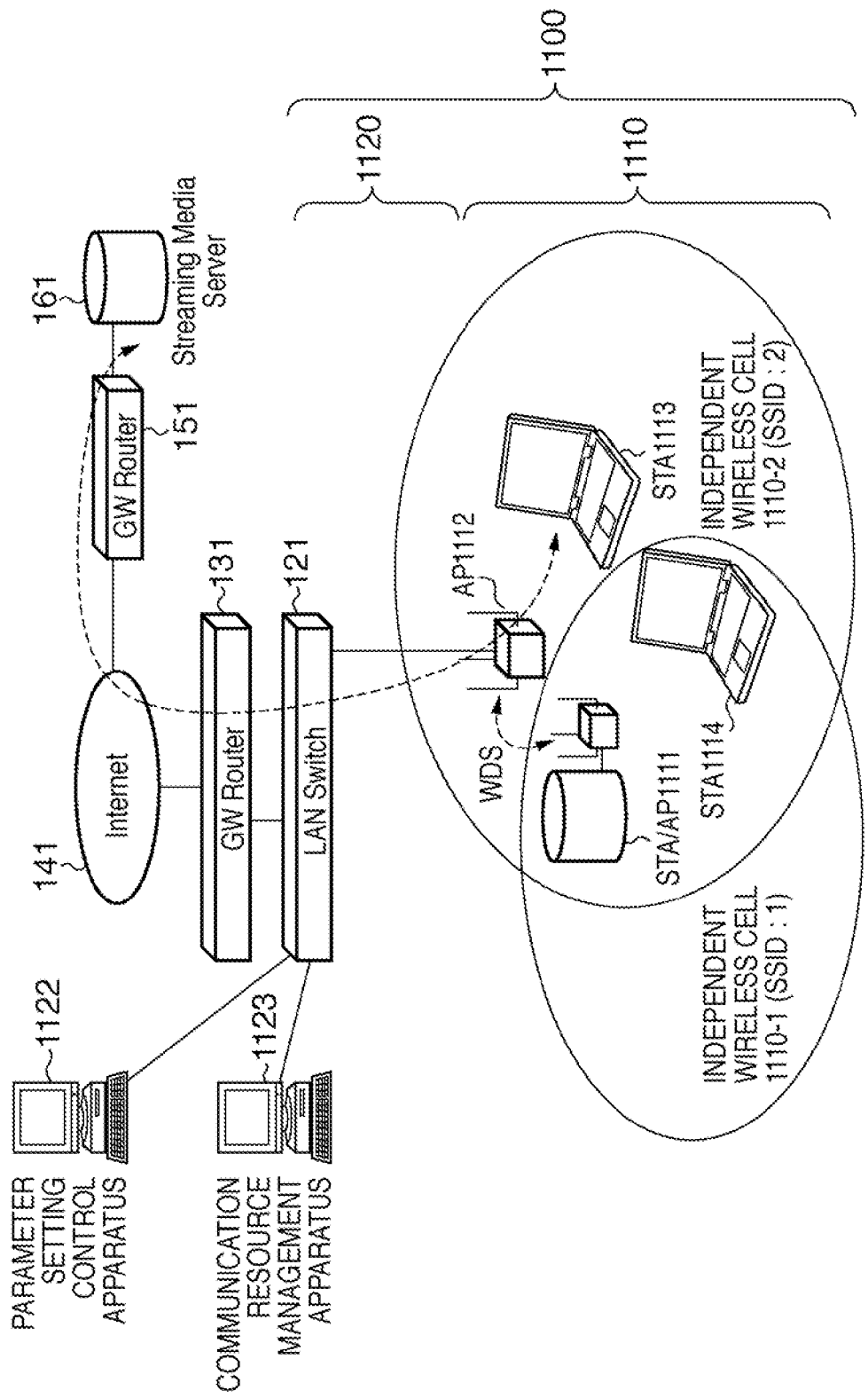
FIG. 11 is a view showing the configuration of a wireless communication local network system 1100 which comprises a communication resource management apparatus (communication control apparatus) according to an embodiment of the present invention.

FIG. 11 is a view showing the configuration of a wireless communication local network system 1100 which comprises a communication resource management apparatus (communication control apparatus) according to an embodiment of the present invention.

As shown in FIG. 11, the wireless communication local network system 1100 is configured using an IEEE802.11-based wireless LAN 1110 and a wired LAN 1120.

The wireless LAN 1110 comprises a wireless access point (AP) 1112 which builds an independent wireless cell 1110-2 (SSID=2) and a wireless dual terminal (STA/AP) 1111 which builds an independent wireless cell 1110-1 (SSID=1). Note that the wireless dual terminal (STA/AP) 1111 has a function as a wireless access point, and that as a wireless client terminal.

Reference numeral 1113 and 1114 denote wireless client terminals (STA) which comprise a playback function of the streaming media data. Note that the wireless client terminal (STA) 1113 is located within the range of the independent wireless cell 1110-2, and the wireless client terminal (STA) 1114 is located within the overlap range of the independent wireless cells 1110-1 and 1110-2.

To a wired LAN switch 121, the wireless access point 1112 is connected. Also, a parameter setting control apparatus 1122, which sets parameter information in the wireless client terminals (STA) 1113 and 1114 located within the ranges of the independent wireless cells, is connected. Furthermore, a communication resource management apparatus 1123 which manages communication resources of respective devices 1111 to 1114 that comprise the wireless LAN 1110 by communicating with these devices is connected.

The wired LAN switch 121 is connected to the Internet 141 via a gateway router 131. A streaming media server 161 is connected via a gateway router 151 to the Internet 141. In this way, the wireless client terminals (STA) 1113 and 1114 can access the streaming media server 161.

<2. Sequence of Communication Control Processing in Wireless Communication Local Network System>

The sequence of communication control processing in the wireless communication local network system 1100 will be described below. Prior to a description, assume that the wireless client terminals (STA) 1113 and 1114, and the wireless dual terminal (STA/AP) 1111 associate with the independent wireless cell 1110-2 built using the wireless access point 1112.

Of these terminals, the wireless client terminal (STA) 1113 accesses the streaming media server 161 and receives the provision of a playback service of streaming media data. The sequence of the communication control processing when the wireless client terminal 1114 wants to receive the provision of the playback service of streaming media data will be described below.

Figure 12:
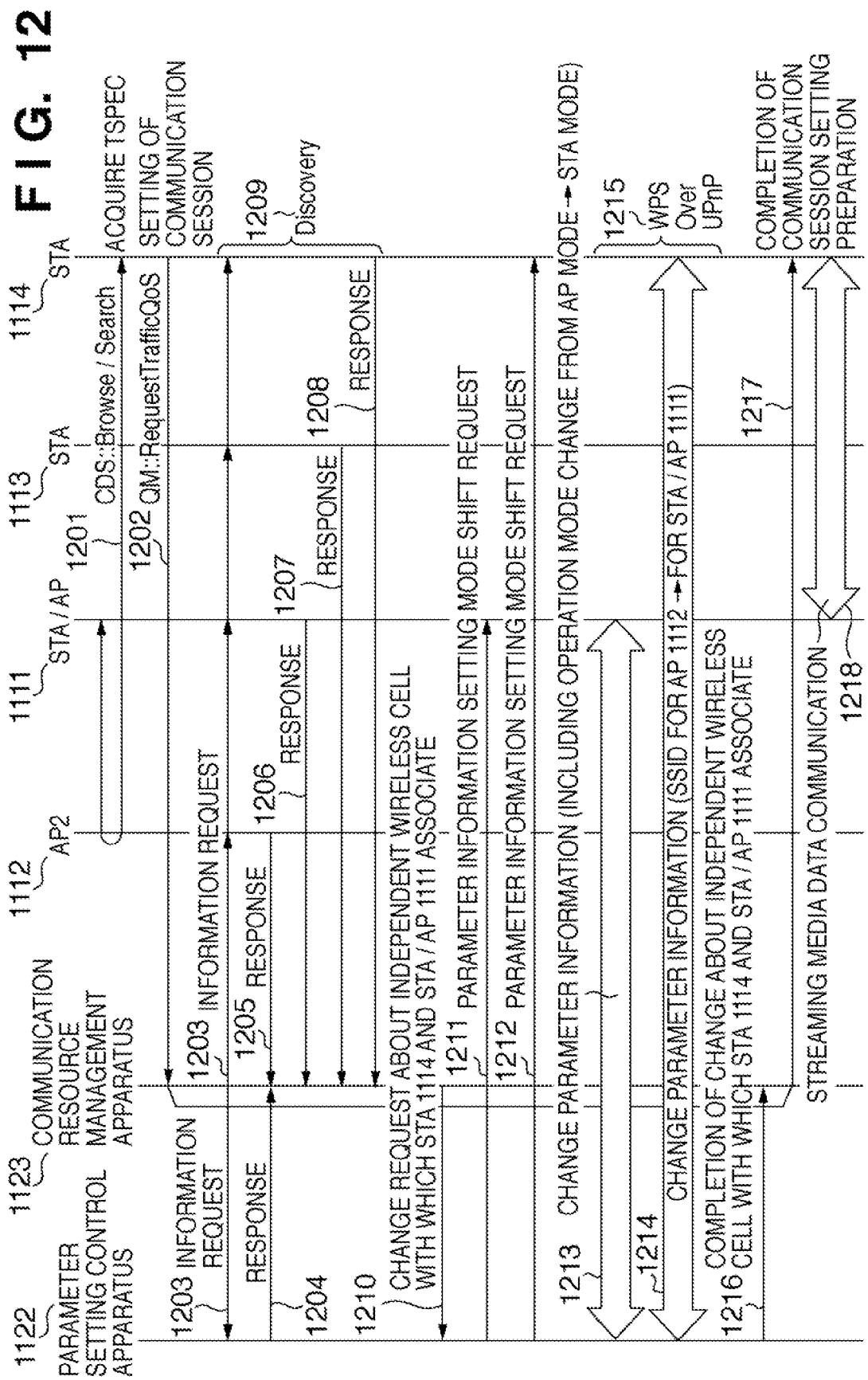
FIG. 12 is a flowchart showing the sequence of the overall communication control processing according to the fourth embodiment in the wireless communication local network system 1100.
Figure 13:
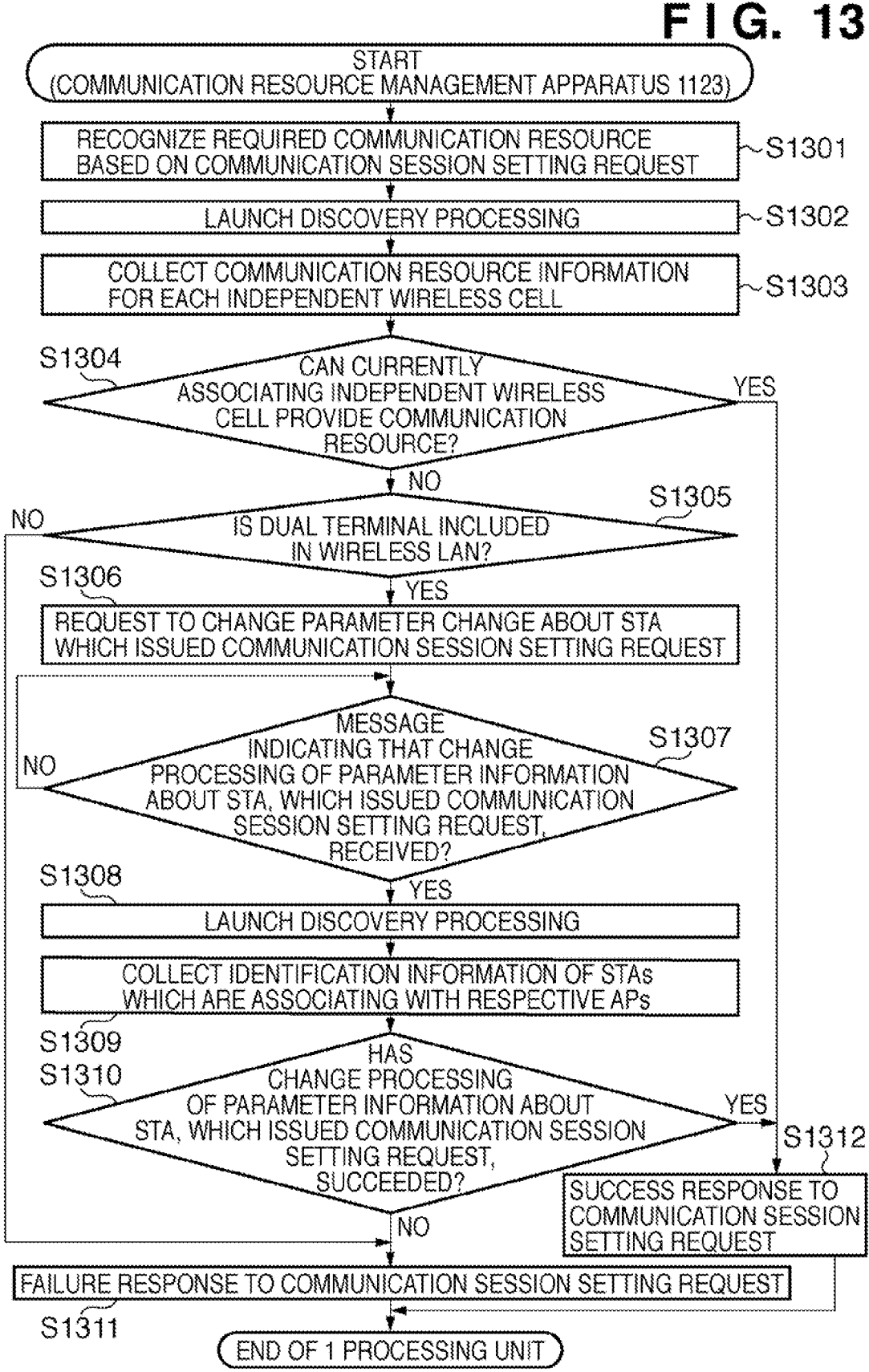
FIG. 13 is a flowchart showing the sequence of individual processing in a communication resource management apparatus 1123.

FIG. 12 is a flowchart showing the sequence of the overall communication control processing in the wireless communication local network system 1100. FIG. 13 is a flowchart showing the sequence of individual processing in the communication resource management apparatus 1123. Note that the sequences of processing in the parameter setting control apparatus 1122 and the wireless client terminals (STA) 1113 and 1114 are basically the same as those in the second embodiment, and a description using the drawings will not be given.

Initially, the wireless access point 1112 acquires information (TSPEC) used to calculate the resource amount required to receive the provision of the playback service from the wireless client terminal 1114 which receives the provision of the playback service of streaming media data.

For this purpose, the wireless access point 1112 launches a message sequence, and transmits an instruction that requests the wireless client terminal 1114 to transmit TSPEC (1201 in FIG. 12).

The wireless client terminal (STA) 1114 transmits the TSPEC to the communication resource management apparatus 1123. Then, the terminal 1114 issues a communication session setting request that requests to assure the resource amount required to receive the provision of the playback service of streaming media data (1202 in FIG. 12).

The communication resource management apparatus 1123 recognizes the required amount of resource in response to the communication session setting request transmitted from the wireless client terminal 1114 (step S1301 in FIG. 13).

Note that this embodiment assumes UPnP AV and UPnP QoS specified by UPnP® as protocols used in these processes, but other protocols may be used.

After the communication resource management apparatus 1123 recognizes the resource amount required for the wireless client terminal 1114 to receive the provision of the playback service of streaming media data, it launches discovery processing (1209 in FIG. 12) (step S1302 in FIG. 13). The communication resource management apparatus 1123 collects communication resource information of the respective devices which comprise the wireless communication local network system 1100 by the discovery processing.

Note that in this embodiment, the parameter setting control apparatus 1122, wireless access point 1112, wireless client terminals 1113 and 1114, and wireless dual terminal 1111 support the discovery processing. For this reason, an information request signal (1203 in FIG. 12) used to collect the communication resource information of the respective devices are transmitted to the parameter setting control apparatus 1122, wireless access point 1112, wireless client terminals 1113 and 1114, and wireless dual terminal 1111.

Upon reception of the information request signal (1203 in FIG. 12), the parameter setting control apparatus 1122, wireless access point 1112, and the like return response signals (1204 to 1208 in FIG. 12) so as to transmit communication resource information accordingly.

In this way, the communication resource management apparatus 1123 can collect the communication resource information for respective independent wireless cells (step S1303 in FIG. 13).

This embodiment assumes Discovery Description specified by UPnP® or LLTD specified by Windows® Rally® as a protocol used in the discovery processing. However, other protocols may be used upon collecting communication resource information.

The communication resource management apparatus 1123 checks based on the collected communication resource information if the currently associating independent wireless cell can provide the amount of resource required to receive the provision of the playback service of streaming media data (step S1304).

If it is determined that the independent wireless cell can provide the required amount of resource, the communication resource management apparatus 1123 transmits a signal indicating that the setting of a communication session has succeeded as a response signal (1217 in FIG. 12) to the communication session setting request from the wireless client terminal 1114 (step S1312 in FIG. 13).

In this case, since preparation for the communication session setting is completed between the wireless access point 1112 and wireless client terminal 1114, a communication of streaming media data starts (1218 in FIG. 12).

On the other hand, if it is determined that the independent wireless cell cannot provide the required amount of resource, the process advances to step S1305 to check based on the collected communication resource information if the wireless dual terminal 1111 is included (step S1305 in FIG. 13).

If it is determined that the wireless dual terminal is not included, the process jumps to step S1311. In step S1311, the communication resource management apparatus 1123 transmits a signal indicating that the setting of a communication session has failed as a response signal (1217 in FIG. 12) to the communication session setting request (step S1311 in FIG. 13).

On the other hand, if it is determined in step S1305 that the wireless dual terminal is included, the communication resource management apparatus 1123 recognizes an independent wireless cell temporarily built using the wireless dual terminal as a switching destination.

Then, the communication resource management apparatus 1123 executes processing for changing the parameter information of the wireless client terminal (STA) 1114 which is to receive the provision of the playback service to that for the wireless dual terminal which builds the independent wireless cell recognized as the switching destination. Also, the apparatus 1123 executes processing for making the wireless dual terminal, which functions as a wireless client terminal, function as a wireless access point. More specifically, the apparatus 1123 transmits a change request instruction (1210 in FIG. 12) for these processes to the parameter setting control apparatus 1122.

In the example of FIG. 11, since the wireless dual terminal 1111 is included, the communication resource management apparatus 1123 recognizes the independent wireless cell built using the wireless dual terminal 1111 as the switching destination. For this purpose, the apparatus 1123 processes to make the wireless dual terminal 1111 function as a wireless access point, and to control the wireless client terminal 1114 to associate with the independent wireless cell built using the wireless dual terminal 1111 after switching. More specifically, the apparatus 1123 transmits a change request instruction (1210 in FIG. 12) of parameter information to the parameter setting control apparatus 1122.

Upon transmitting the change request instruction (1210 in FIG. 12) to the parameter setting control apparatus 1122, the communication resource management apparatus 1123 transmits the identification information of the wireless client terminal 1114 which is to receive the playback service of the streaming media data. Also, the apparatus 1123 transmits the identification information of the wireless dual terminal 1111 which builds the independent wireless cell as the switching destination together.

Note that a MAC address, IP address, UUID, or the like is assumed as the identification information of the wireless client terminal and wireless dual terminal. However, the present invention is not particularly limited to such specific information as long as information to be used allows the parameter setting control apparatus 1122 to specify a device.

Upon reception of the change request instruction (1210 in FIG. 12), the parameter setting control apparatus 1122 recognizes the identification information of the wireless client terminal 1114, which is to associate after switching, and that of the wireless dual terminal 1111 which builds the independent wireless cell as the switching destination.

After the parameter setting control apparatus 1122 recognizes the change request instruction, it acquires PIN information for authentication required to set the parameter information for the wireless dual terminal 1111 that used to build the independent wireless cell as the switching destination in the wireless client terminal 1114.

The parameter setting control apparatus 1122 transmits in-band messages (1211 and 1212 in FIG. 12) that request to shift to a parameter information setting mode to the wireless client terminal 1114, which is to associate after switching. Also, the apparatus 1122 transmits PIN information for authentication together.

Upon reception of the messages (1211 and 1212 in FIG. 12) that request to shift to the parameter information setting mode, the wireless client terminal 1114 and wireless dual terminal 1111 shift to the parameter information setting mode using the PIN information for authentication received together with the messages.

After that, the parameter setting control apparatus 1122, wireless client terminal 1114, and wireless dual terminal 1111 execute parameter information setting processing (1213 to 1215) using Wi-Fi Protected Setup®. As a result, the wireless dual terminal 1111 is changed from an operation mode in which it serves as a wireless client terminal to that in which it serves as a wireless access point. Furthermore, the SSID set in the wireless client terminal 1114 is changed from "2" to "1".

Note that this embodiment uses Wi-Fi Protected Setup® as a setting protocol of the parameter information, but the setting processing can be implemented using other in-band parameter setting processes.

It is then checked if the wireless client terminal 1114 successfully associates with the independent wireless cell built using the wireless dual terminal 1111. If it is determined that the association with the independent wireless cell built using the wireless dual terminal 1111 has failed, the parameter information is returned to the original information, and the wireless client terminal associates with the independent wireless cell before switching.

On the other hand, if it is determined that the association with the independent wireless cell built using the wireless dual terminal 1111 has succeeded, the switching processing ends.

The parameter setting control apparatus 1122 monitors if the switching processing by the wireless client terminal 1114 is complete. If it is determined that the switching processing is complete, the apparatus 1122 transmits a message (1216 in FIG. 12) indicating that the change processing of the parameter information for the wireless client terminal 1114 is complete to the communication resource management apparatus 1123.

The communication resource management apparatus 1123 monitors if the message indicating that the change processing of the parameter information for the wireless client terminal 1114 is complete is transmitted from the parameter setting control apparatus 1122 (step S1307 in FIG. 13). If it is determined that the communication resource management apparatus 1123 receives the message, the process advances to step S1308.

In step S1308, the communication resource management apparatus 1123 launches the discovery processing again. Since details of the discovery processing have been described above, a repetitive description thereof will be avoided.

In step S1309, the communication resource management apparatus 1123 collects identification information of the wireless client terminals (STA) which are associating with the independent wireless cell built using the wireless access point 1112 as a result of the discovery processing.

The communication resource management apparatus 1123 checks in step S1310 if the wireless client terminal 1114 which is to associate after switching is associated with the independent wireless cell 1110-1 as the switching destination.

More specifically, the communication resource management apparatus 1123 checks if the independent wireless cell with which the wireless client terminal 1114 currently associates is the same as that with which the terminal associated before transmission of the change request instruction.

If it is determined that the current independent wireless cell is the same as that before transmission of the change request instruction, the communication resource management apparatus 1123 determines in step S1310 that the switching processing of the wireless client terminal has failed, and the process advances to step S1311.

In step S1311, the communication resource management apparatus 1123 transmits a signal indicating that the setting of a communication session has failed (indicating that required communication resources cannot be assured) as a response signal (1217) to the communication session setting request from the wireless client terminal 1114.

On the other hand, if it is determined that the current independent wireless cell is different from that before transmission of the change request instruction, the communication resource management apparatus 1123 determines in step S1310 that the switching processing of the wireless client terminals has succeeded. Then, the apparatus 1123 transmits a signal indicating that the setting of a communication session has succeeded as a response signal (1217 in FIG. 12) to the communication session setting request.

As a result, the wireless client terminal 1114 can receive the provision of the playback service of streaming media data (1218 in FIG. 12).

As can be seen from the above description, in this embodiment, when the wireless client terminal receives the provision of a new communication service, the current independent wireless cell can be switched to another independent wireless cell as needed in consideration of the resource amount required to receive the provision of the service.

Also, according to this embodiment, when the wireless dual terminal is included in the system, the switching processing can be executed to include, as the switching destination, an independent wireless cell temporarily generated by that wireless dual terminal.

Fifth Embodiment

The fourth embodiment has explained the case in which when the wireless client terminal wants to receive the provision of a new communication service, the current independent wireless cell is switched to another independent wireless cell as needed in consideration of the resource amount, and that wireless client terminal associates with the switched cell. However, the present invention is not limited to this. For example, when the wireless client terminal which is already receiving the provision of the communication service requests to release the reception of that service, the current independent wireless cell may be switched to another independent wireless cell as needed in response to that release request, and that wireless client terminal may associate with the switched cell.

<1. Configuration of Wireless Communication Local Network System>

The configuration of a wireless communication local network system to which a communication resource management apparatus according to this embodiment is applied is the same as the fourth embodiment, and a repetitive description thereof will be avoided.

<2. Sequence of Communication Control Processing in Wireless Communication Local Network System>

The sequence of the communication control processing of this embodiment in the wireless communication local network system 1100 will be described below.

Prior to a description, assume that the wireless client terminal (STA) 1113 associates with the independent wireless cell 1110-2 built using the wireless access point 1112. Also, assume that the wireless dual terminal (STA/AP) 1111 serves as a wireless access point, and the wireless client terminal 1114 associates with the independent wireless cell 1110-1 built using the wireless dual terminal 1111.

Furthermore, assume that the wireless client terminal (STA) 1114 which associates with the independent wireless cell 1110-1 accesses the streaming media server 161 and receives the provision of a playback service of streaming media data.

This embodiment will explain the sequence of the communication control processing when the wireless client terminal 1114 wants to release the reception of the playback service of streaming media data.

Note that the wireless client terminals (STA) 1113 and 1114 and wireless dual terminal 1111 have a function of requesting release of a use frequency band to the communication resource management apparatus 1123.

Figure 14:
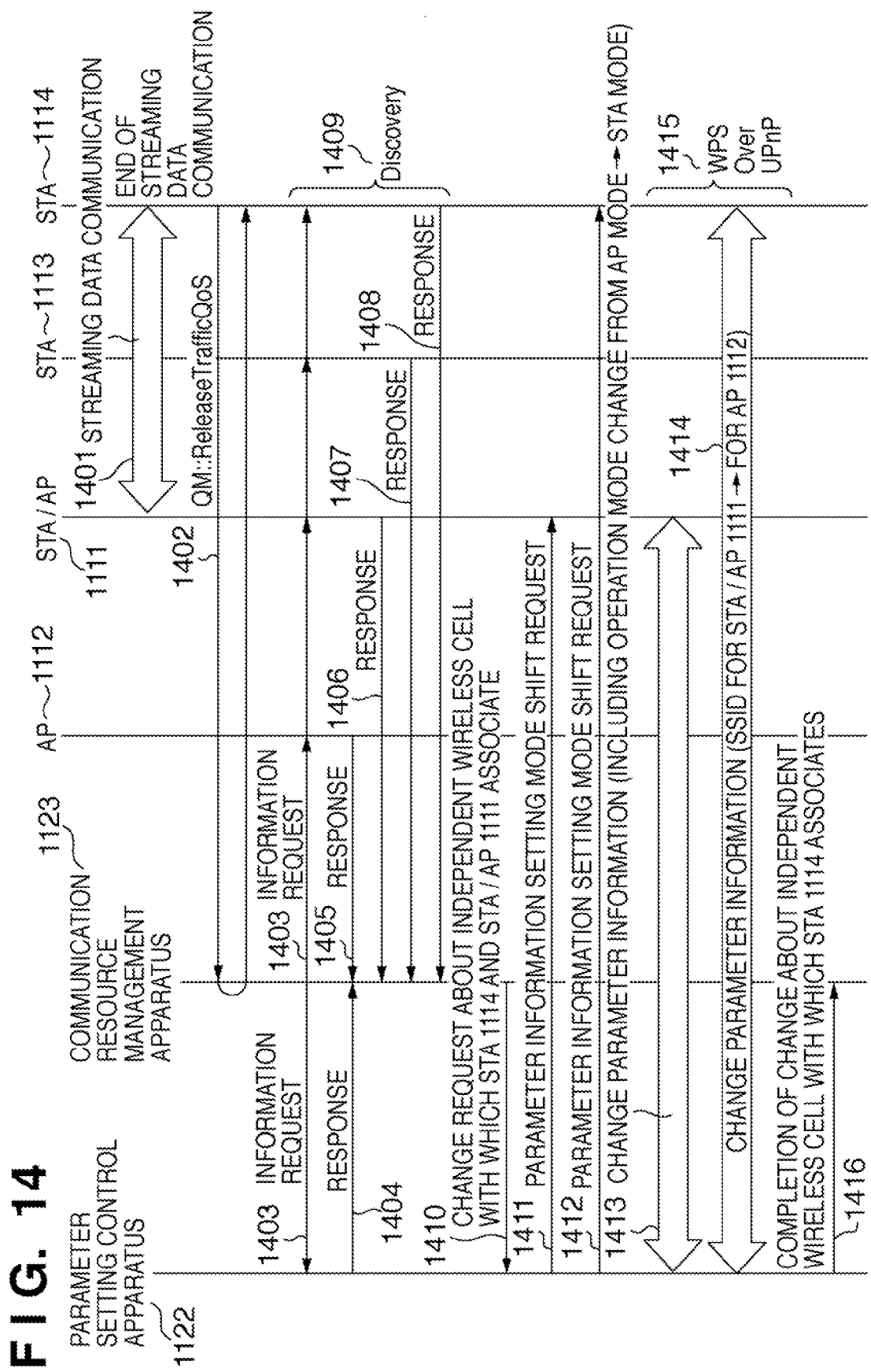
FIG. 14 is a flowchart showing the sequence of the overall communication control processing according to the fifth embodiment in the wireless communication local network system 1100.
Figure 15:
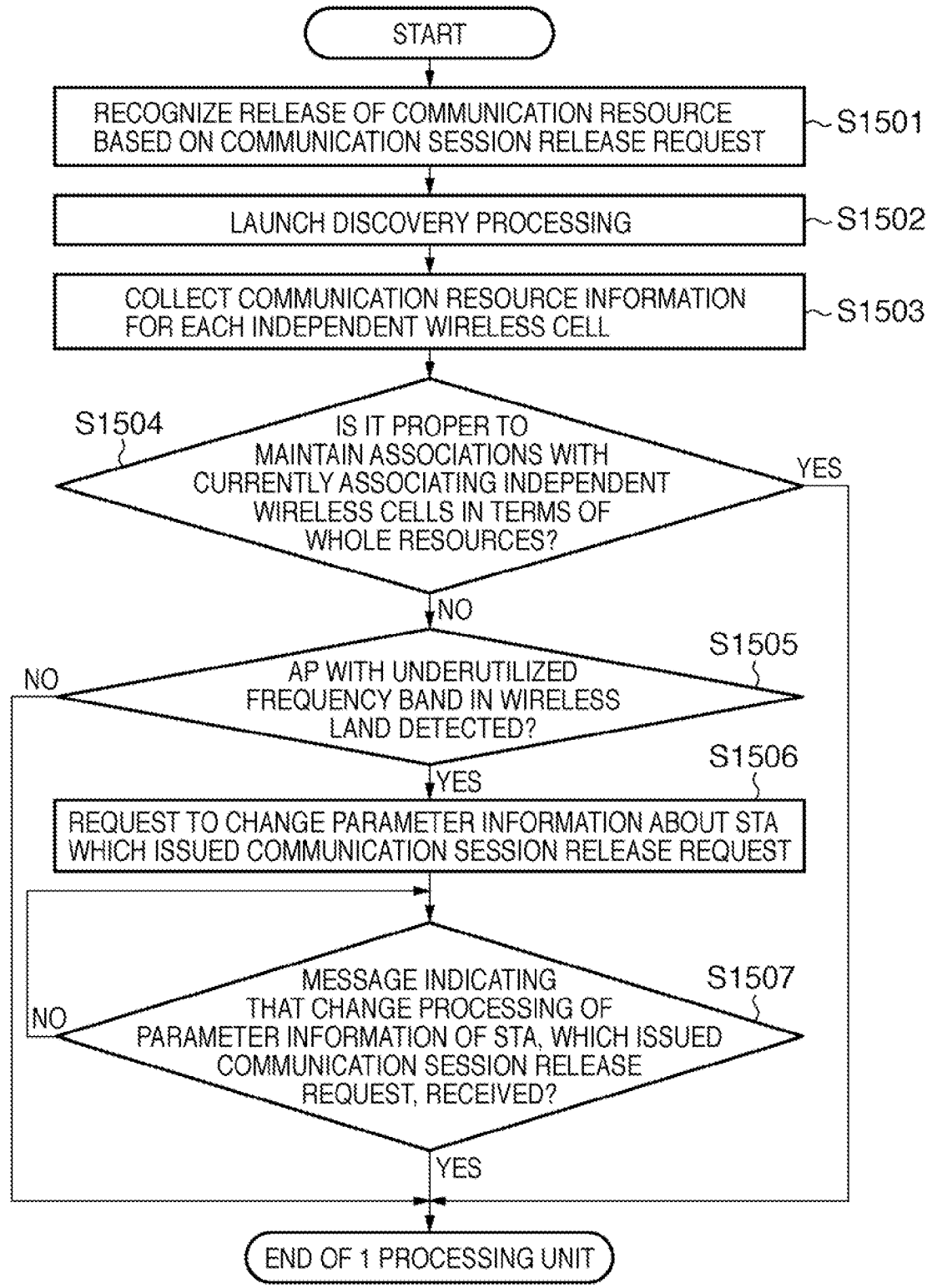
FIG. 15 is a flowchart showing the sequence of individual processing in the communication resource management apparatus 1123.

FIG. 14 is a flowchart showing the sequence of the overall communication control processing of this embodiment in the wireless communication local network system 1100. FIG. 15 is a flowchart showing the sequence of individual processing in the communication resource management apparatus 1123. Note that the sequences of processing in the parameter setting control apparatus 1122 and the wireless client terminal (STA) 1114 are basically the same as those in the fourth embodiment, and a description thereof will not be repeated.

Initially, the wireless client terminal 1114 which receives the provision of the playback service (1401 in FIG. 14) transmits a communication session release request (1402 in FIG. 14) so as to request to release communication resources used to receive the provision of the playback service.

Note that this embodiment assumes UPnP (Universal Plug and Play) QoS specified by UPnP® as a protocol used to transmit the communication session release request. However, other protocols may be used.

In step S1501 (FIG. 15), the communication resource management apparatus 1123 receives the communication session release request (1402 in FIG. 14) from the wireless client terminal 1114. As a result, the communication resource management apparatus 1123 recognizes that communication resources used by the wireless client terminal 1114 to receive the provision of the playback service are released.

After the communication resource management apparatus 1123 recognizes that the communication resources are released, it launches discovery processing so as to collect communication resource information of the respective devices which comprise the wireless communication local network system 1100 (step S1502 in FIG. 15).

Note that in this embodiment, the parameter setting control apparatus 1122, wireless access point 1112, wireless client terminals 1113 and 1114, and wireless dual terminal 1111 support the discovery processing. For this reason, an information request signal (1403 in FIG. 14) used to collect the communication resource information of the respective devices is transmitted to the parameter setting control apparatus 1122, wireless access point 1112, wireless dual terminal 1111, and wireless client terminals 1113 and 1114.

Upon reception of the information request signal (1403 in FIG. 14), the parameter setting control apparatus 1122, wireless access point 1112, wireless dual terminal 1111, and the like return response signals (1404 to 1409 in FIG. 14) so as to transmit communication resource information accordingly.

In this way, the communication resource management apparatus 1123 can collect the communication resource information for respective independent wireless cells (step S1503 in FIG. 15).

This embodiment assumes Discovery Description specified by UPnP® or LLTD specified by Windows® Rally® as a protocol used in the discovery processing. However, other protocols may be used upon collecting communication resource information.

The communication resource management apparatus 1123 checks based on the collected communication resource information if it is proper to maintain the current association states with the independent wireless cells in terms of the balance of the communication resources of the whole system (step S1504 in FIG. 15).

If it is determined in step S1504 that it is proper to maintain the current association states, the communication resource management apparatus 1123 maintains the current association states with the independent wireless cells.

On the other hand, if it is determined in step S1504 that it is not proper to maintain the current association states, the communication resource management apparatus 1123 checks if a wireless access point with underutilized communication resources is found in the wireless LAN 1110, so as to improve the balance of the communication resources (step S1505 in FIG. 15).

If it is determined in step S1505 that no wireless access point with underutilized communication resources is found, the processing ends.

On the other hand, if it is determined in step S1505 that a wireless access point with underutilized communication resources is found, the communication resource management apparatus 1123 recognizes an independent wireless cell built using that wireless access point as a switching destination.

Then, the communication resource management apparatus 1123 executes processing for changing the parameter information of the wireless client terminal (STA) 1114 which is to release the reception of the playback service to that for the wireless access point which builds the independent wireless cell recognized as the switching destination. Also, the apparatus 1123 executes processing for making the wireless dual terminal 1111, which functioned as the wireless access point that built the independent wireless cell with which the terminal 1114 associated before switching, function as a wireless client terminal. More specifically, the apparatus 1123 transmits a change request instruction (1410 in FIG. 14) for these processes to the parameter setting control apparatus 1122.

In the example of FIG. 11, the communication resource management apparatus 1123 determines the wireless access point 1112 as a wireless access point with underutilized communication resources. For this reason, the apparatus 1123 processes to control the wireless client terminal 1114 to associate with the independent wireless cell built using the wireless access point 1112 after switching, and to control the wireless dual terminal 1111 to serve as a wireless client terminal. More specifically, the apparatus 1123 transmits a change request instruction (1410 in FIG. 14) for these processes to the parameter setting control apparatus 1122.

Upon transmitting the change request instruction (1410 in FIG. 14) to the parameter setting control apparatus 1122, the communication resource management apparatus 1123 transmits the identification information of the wireless client terminal 1114 which is to release the reception of the playback service. Furthermore, the apparatus 1123 transmits the identification information of the wireless access point 1112 which builds the independent wireless cell 1110-2 as the switching destination together.

Note that a MAC address, IP address, UUID, or the like is assumed as the identification information of the wireless client terminal and wireless access point. However, the present invention is not particularly limited to such specific information as long as information to be used allows the parameter setting control apparatus 1122 to specify a device.

Upon reception of the change request instruction (1410 in FIG. 14), the parameter setting control apparatus 1122 recognizes the identification information of the wireless client terminal 1114, which is to associate after switching, and that of the wireless access point 1112 which builds the independent wireless cell as the switching destination.

After the parameter setting control apparatus 1122 recognizes the change request instruction, it acquires PIN information for authentication required to set the parameter information for the wireless access point 1112 that used to build the independent wireless cell as the switching destination in the wireless client terminal.

The parameter setting control apparatus 1122 transmits an in-band message (1414 in FIG. 14) that requests to shift to a parameter information setting mode to the wireless client terminal 1114, which is to associate after switching. Also, the apparatus 1122 transmits an in-band message (1413 in FIG. 14) that requests to shift to a parameter information setting mode to the wireless dual terminal 1111, the operation mode of which is changed to serve as a wireless client terminal. Furthermore, the apparatus 1122 transmits PIN information for authentication together.

Upon reception of the messages (1413 and 1414 in FIG. 14) that request to shift to the parameter information setting mode, the wireless client terminal 1114 and wireless dual terminal 1111 shift to the parameter information setting mode using the PIN information for authentication received together with the messages.

After that, the parameter setting control apparatus 1122, wireless client terminal 1114, and wireless dual terminal 1111 execute parameter information setting processing (1413 to 1415) using Wi-Fi Protected Setup®. As a result, the SSID set in the wireless client terminal 1114 is changed from "1" to "2". Also, the wireless dual terminal 1111 is changed from the operation mode in which it serves as a wireless access point to that in which it serves as a wireless client terminal.

Note that this embodiment uses Wi-Fi Protected Setup® as a setting protocol of the parameter information, but the setting processing can be implemented using other in-band parameter setting processes.

It is then checked if the wireless client terminal 1114 and wireless dual terminal 1111 successfully associate with the independent wireless cell 1110-2 built using the wireless access point 1112. If it is determined that the associations with the independent wireless cell 1110-2 built using the wireless access point 1112 have failed, the parameter information is returned to the original information. As a result, the wireless dual terminal 1111 serves as a wireless access point, and the wireless client terminal 1114 associates with the independent wireless cell 1110-1 before switching, which is built using the wireless dual terminal 1111.

On the other hand, if it is determined that the associations with the wireless access point 1112 have succeeded, the switching processing ends.

The parameter setting control apparatus 1122 monitors if the switching processing by the wireless client terminal 1114 and wireless dual terminal 1111 is complete. If it is determined that the switching processing is complete, the apparatus 1122 transmits a message (1416 in FIG. 14) indicating that the change processing of the parameter information for the wireless client terminal 1114 and wireless dual terminal 1111 is complete to the communication resource management apparatus 1123.

The communication resource management apparatus 1123 monitors if the message indicating that the change processing of the parameter information for the wireless client terminal 1114 and wireless dual terminal 1111 is complete is transmitted from the parameter setting control apparatus 1122 (step S1507 in FIG. 15).

As can be seen from the above description, in this embodiment, when the wireless client terminal that receives the provision of a communication service requests to release that reception, the balance of the communication resources in the wireless communication local network system is readjusted in response to that release request. As a result, the independent wireless cell with which the wireless client terminal currently associates with can be switched as needed, and the communication resources in the wireless communication local network system can be optimally distributed.

Also, according to this embodiment, when the wireless dual terminal temporarily builds an independent wireless cell, this operation mode can be ended in response to a release request of the reception of a communication service from the wireless client terminal that associated with this independent wireless cell.

Other Embodiments

Note that the communication resource management apparatus and parameter setting control apparatus have been described as independent apparatuses in the above description, but they may be configured as a single apparatus.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved when a computer-readable storage medium that stores a program code of software required to implement the functions of the aforementioned embodiments is supplied to a system or apparatus. In this case, the functions are implemented when a computer (or a CPU or MPU) of that system or apparatus reads out and executes the program code stored in a recording medium. In this case, the recording medium that records the program code constitutes the present invention.

As the recording medium used to supply the program code, for example, a Floppy® disk, hard disk, optical disk, magneto-optical disk, CD-ROM, CD-R, magnetic tape, nonvolatile memory card, ROM, and the like can be used.

The present invention is not limited to a case in which the functions of the aforementioned embodiments are implemented when the computer executes the readout program code. For example, the present invention also includes a case in which an OS (operating system) running on the computer executes some or all of actual processes based on an instruction of the program code, thereby implementing the functions of the aforementioned embodiments.

Furthermore, the present invention also includes a case in which the functions of the aforementioned embodiments are implemented after the program code read out from the recording medium is written in a memory equipped on a function expansion board or function expansion unit, which is inserted into or connected to the computer. That is, the present invention also includes a case in which after the program code is written in the memory, a CPU equipped on the function expansion board or unit executes some or all of actual processes based on an instruction of the program code, thereby implementing the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-282351 filed on Oct. 30, 2007, which is hereby incorporated by reference herein in its entirety.

What is claimed is:

1. A communication system, which includes a plurality of access points, a management apparatus that manages processing loads of the plurality of said access points, and a parameter setting control apparatus that manages parameter information required to make a communication between a client terminal and the access point, wherein said management apparatus comprises:
a collecting unit configured to collect information related to client terminals associated to each of the access points from each of the access points;
a detecting unit configured to detect processing load of each of the access points, based on the information collected by the collecting unit, and
a notification unit configured to notify said parameter setting control apparatus of switching of an associate destination to a second access point by a first client terminal which is selected based on predetermined priority order among client terminals associated with a first access point, in accordance with the processing load of the first access point and the processing load of the second access point, and
wherein said parameter setting control apparatus comprises:
a transmission unit configured to transmit authentication information used in setting processing of parameter information required to communicate with the second access point to the first client terminal based on the notification, wherein said management apparatus determines whether or not the first client terminal completes the switching of an associate destination to the second access point after said transmission unit transmitted the authentication information to the first client terminal, and if the first client terminal failed to the switching of an associate destination to the second access point, said management apparatus sets the priority order of the first client terminal to be lower order.

2. The system according to claim 1, wherein said transmission unit transmits a shift instruction to a parameter information setting mode to the first client terminal together with the authentication information.

3. The system according to claim 1, wherein the first client terminal comprises:
a setting unit configured to execute setting processing of parameter information required to communicate with the second access point between itself and said parameter setting control apparatus using the authentication information transmitted from said transmission unit; and
a connection control unit configured to associate with the second access point based on the parameter information set by said setting unit.

4. The system according to claim 1, wherein said management apparatus further comprises:
a determination unit configured to determine if the first access point with which the first client terminal currently associates can provide communication resource requested from the first client terminal; and
a detection unit configured to detect the second access point which can provide the communication resource when said determination unit determines that the first access point cannot provide the communication resource, and
wherein said notification unit notifies said parameter setting control apparatus of switching of the associate destination to the detected second access point.

5. The system according to claim 4, wherein said management apparatus further comprises:
a response unit configured to transmit information indicating that a session setting has failed to the first client terminal as a response to a session setting request when said detection unit cannot detect the second access point that can provide the communication resource.

6. The system according to claim 1, wherein
said management apparatus further comprises:
a determination unit configured to determine a relationship between a communication resource that can be provided by the first access point with which the first client terminal currently associates, and a communication resource that can be provided by the second access point, in response to a session release request from the first client terminal, and
wherein said notification unit notifies said parameter setting control apparatus of switching of the associate destination to the second access point with a larger communication resource than the communication resource which can be provided by the first access point, based on the determination result of said determination unit.

7. The system according to claim 1, wherein said management apparatus further comprises:
a determination unit configured to determine if the first access point with which the first client terminal currently associates can provide communication resource requested from the first client terminal; and
a detection unit configured to detect a dual terminal which is a second client terminal that associates with the first access point and has a function as an access point, when said determination unit determines that the first access point cannot provide the communication resource, and
wherein said notification unit notifies said parameter setting control apparatus of switching of the associate destination to the dual terminal detected by said detection unit.

8. The system according to claim 7, wherein said management apparatus further comprises:
a response unit configured to transmit information indicating that a session setting has failed to the first client terminal as a response to a session setting request when said detection unit cannot detect the dual terminal.

9. A method of controlling a communication system, which includes a a plurality of access points, a management apparatus that manages processing loads of the plurality of said access points, and a parameter setting control apparatus that manages parameter information required to make a communication between a client terminal and the access point,
wherein said management apparatus
collects information related to client terminals associated to each of the access points from each of the access points,
detects processing load of each of the access points, based on the collected information, and
notifies said parameter setting control apparatus of switching of an associate destination to a second access point by a first client terminal which is selected based on predetermined priority order among client terminals associated with a first access point, and
wherein said parameter setting control apparatus transmits authentication information used in setting processing of parameter information required to communicate with the second access point to the first client terminal based on the notification,
wherein management apparatus determines whether or not the first client terminal completes the switching of an associate destination to the second access point after the authentication information was transmitted to the first client terminal, and if the first client terminal failed the switching of an associate destination to the second access point, said management apparatus sets the priority order of the first client terminal to be lower order.

* * * * *